(12) United States Patent
Babu J D et al.

(10) Patent No.: US 11,201,953 B2
(45) Date of Patent: Dec. 14, 2021

(54) APPLICATION SHARING

(71) Applicant: Magic Leap, Inc., Plantation, FL (US)

(72) Inventors: Praveen Babu J D, Plantation, FL (US); Karen Stolzenberg, Fort Lauderdale, FL (US); Jehangir Tajik, Fort Lauderdale, FL (US); Rohit Anil Talwalkar, Weston, FL (US); Colman Thomas Bryant, Fort Lauderdale, FL (US); Leonid Zolotarev, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/518,891

(22) Filed: Jul. 22, 2019

(65) Prior Publication Data
US 2020/0036816 A1 Jan. 30, 2020

Related U.S. Application Data

(60) Provisional application No. 62/741,761, filed on Oct. 5, 2018, provisional application No. 62/702,844, filed
(Continued)

(51) Int. Cl.
*H04L 29/06* (2006.01)
*H04L 29/08* (2006.01)
(Continued)

(52) U.S. Cl.
CPC .......... *H04L 67/38* (2013.01); *G02B 27/017* (2013.01); *G06T 19/006* (2013.01); *H04L 63/10* (2013.01);
(Continued)

(58) Field of Classification Search
CPC ......... H04L 67/38; H04L 63/10; H04L 67/36; H04L 67/16; G06T 19/006; H04W 4/021;
(Continued)

(56) References Cited

U.S. PATENT DOCUMENTS 9,811,237 B2 * 11/2017 Schileru .............. G06F 3/04815
10,528,349 B2 * 1/2020 Kumar .................. G06F 9/3867
(Continued)

FOREIGN PATENT DOCUMENTS

WO       2018175335 A1     9/2018

OTHER PUBLICATIONS

International Search Report dated Oct. 2, 2019, for PCT Application No. PCT/US2019/042881, filed Jul. 22, 2019, three pages.
(Continued)

*Primary Examiner* — Tu T Nguyen
(74) *Attorney, Agent, or Firm* — Morrison & Foerster LLP

(57) ABSTRACT

A host device having a first processor executes an application via the first processor. The host device determines a state of the application. A scenegraph is generated corresponding to the state of the application, and the scenegraph is presented to a remote device having a display and a second processor. The remote device is configured to, in response to receiving the scenegraph, render to the display a view corresponding to the scenegraph, without executing the application via the second processor.

36 Claims, 11 Drawing Sheets

Related U.S. Application Data on Jul. 24, 2018, provisional application No. 62/726,863, filed on Sep. 4, 2018, provisional application No. 62/742,259, filed on Oct. 5, 2018.

(51) Int. Cl.
*G06T 19/00* (2011.01)
*H04W 4/021* (2018.01)
*G02B 27/01* (2006.01)

(52) U.S. Cl.
CPC .............. *H04L 67/16* (2013.01); *H04L 67/36* (2013.01); *H04W 4/021* (2013.01)

(58) Field of Classification Search
CPC .... G02B 27/017; A63F 13/352; A63F 13/355; A63F 13/30
USPC ........................................................ 709/203
See application file for complete search history.

(56) References Cited

U.S. PATENT DOCUMENTS

| | | |
|---|---|---|
| 2005/0182844 A1 | 8/2005 | Johnson |
| 2014/0123184 A1 | 5/2014 | Reisman |
| 2016/0104452 A1 | 4/2016 | Guan et al. |
| 2016/0343164 A1 | 11/2016 | Urbach |
| 2017/0236320 A1 | 8/2017 | Gribetz |
| 2020/0005538 A1 | 1/2020 | Neeter |
| 2020/0051328 A1 | 2/2020 | Mohan et al. |
| 2020/0051337 A1 | 2/2020 | Reynolds et al. |

OTHER PUBLICATIONS

International Preliminary Report on Patentability and Written Opinion dated Jan. 26, 2021, for PCT Application No. PCT/US2019/042881, filed Jul. 22, 2019, 16 pages.

International Search Report and Written Opinion dated Apr. 28, 2021, for PCT Application No. PCT/US2021/17508, filed Feb. 10, 2021, 16 pages.

International Search Report and Written Opinion dated Jun. 15, 2021, for PCT Application No. PCT/US2021/18037, filed Feb. 12, 2021, 17 pages.

International Search Report and Written Opinion dated May 3, 2021, for PCT Application No. PCT/US2021/18035, filed Feb. 12, 2021, 14 pages.

\* cited by examiner

APPLICATION SHARING

CROSS-REFERENCE TO RELATED APPLICATION

This application claims priority to U.S. Provisional Application No. 62/741,761, filed on Oct. 5, 2018, U.S. Provisional Application No. 62/702,844, filed on Jul. 24, 2018, U.S. Provisional Application No. 62/726,863, filed on Sep. 4, 2018, and U.S. Provisional Application No. 62/742,259, filed on Oct. 5, 2018, the contents of which are incorporated by reference herein in their entirety.

FIELD

This disclosure relates in general to systems and methods for presenting data of a computer application, and in particular to systems and methods for presenting data of a computer application executing on a local device to a remote device.

BACKGROUND

With the proliferation of personal devices that are ever smaller, lighter, and more mobile, and the accompanying popularity of content-on-demand services, users' expectations for software applications have changed. Software, much like streamed video content, for example, is frequently expected to be instantly accessible; to have a small resource footprint; and to be easily shareable with others. Conventional software—which may need to be purchased, downloaded, and installed before it can be used—may not fit the bill for some users. Moreover, conventional software may be too resource-intensive for increasingly mobile computing devices, including wearable devices, which must contend with limits on physical size, shape, and heft—limiting the storage, processing power, and battery capacity of those devices—and which may need to be compatible with limited-bandwidth cellular data plans.

One response to the above is for software applications to feature "sharing" functionality, whereby a user can remotely access (e.g., observe or interact with) an application executing on a host device. Because application sharing eliminates the need for remote users to install or execute the application on their computing devices, their barriers to entry are lowered, encouraging the use and proliferation of "shareable" applications.

Application sharing is not without potential issues. Some examples of application sharing involve streaming pre-rendered video data, representing the visual output of the application; however, because such video data can be bandwidth-intensive, practical usage of these applications can be limited to high bandwidth environments, precluding their use on many mobile data plans. It is desirable for a host computing device to share a software application with one or more remote computing devices, such that users of all such devices can simultaneously view and/or interact with the software application, without the need for the remote devices to install or execute that software application locally. It is further desirable to minimize the amount of data that must be transferred between host devices and remote devices, in order to facilitate use in low-bandwidth environments.

BRIEF SUMMARY

Systems and methods for sharing a software application for a computing device are disclosed. According to some examples, a host device having a first processor executes an application via the first processor. The host device determines a state of the application. A scenegraph is generated corresponding to the state of the application, and the scenegraph is presented to a remote device having a display and a second processor. The remote device is configured to, in response to receiving the scenegraph, render to the display a view corresponding to the scenegraph, without executing the application via the second processor.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
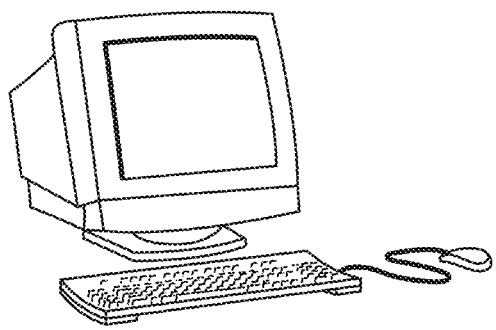
FIGS. 1A-1E illustrate example computer systems that can participate in application sharing according to examples of the disclosure.
Figure 1B:
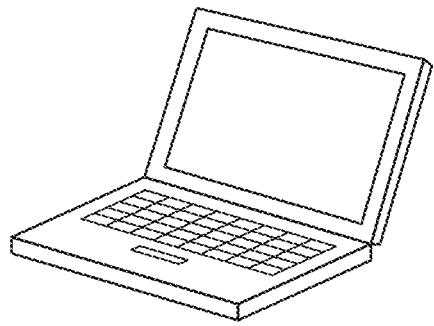
Figure 1C:
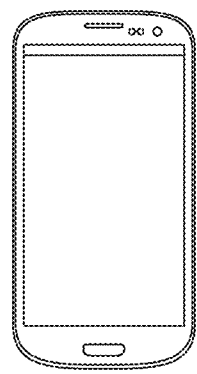
Figure 1D:
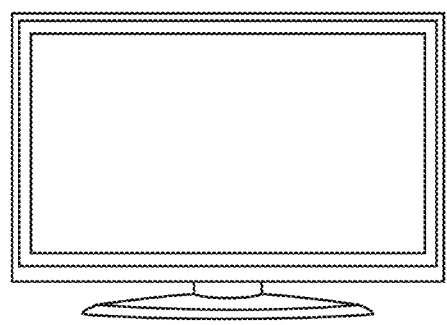
Figure 1E:
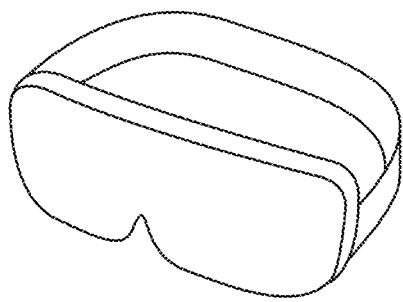

FIGS. 1A through 1E illustrate various example computer systems with displays. FIG. 1A shows an example desktop computer connected to an external monitor. FIG. 1B shows an example laptop including a display. FIG. 1C shows an example mobile device including an integrated display. FIG. 1D shows an example television including a display. FIG. 1E shows an example computer system including a head-mounted display. The disclosure is not limited to any particular type of computer system, to any particular type of display, or to any particular means of connecting a computer system to a display. The disclosure further is not limited to two-dimensional displays; in particular, three-dimensional displays, such as stereoscopic displays, are contemplated.

The disclosure contemplates the use of centralized rendering techniques for application sharing. Such techniques are described, for example, in U.S. patent applications Ser.

Nos. 15/940,892 and 16/011,413, both of which are herein incorporated by reference in their entirety. By using centralized rendering techniques, as described below and in the aforementioned applications, local and remote users sharing an application can independently render graphical data that accurately presents a convincing view of the shared application. By independently rendering graphical data—rather than receiving pre-rendered graphical data from a host device, for example—the bandwidth requirements of the application sharing systems and methods described herein can be reduced.

Centralized Rendering

In some example computer systems, data to be graphically presented (as a "rendered scene") on a display includes data representing objects (such as 2D or 3D geometric primitives, including polygons) in a three-dimensional space ("3D data"), and presenting the 3D data on the display includes presenting an image corresponding to the objects in the three-dimensional space as viewed from a view origin oriented along a view axis (a "displayed scene"). For example, in a software application (such as a video game using a 3D engine) running on a computer system, 3D data may include spatial coordinates, orientations, and/or visual properties of objects in a three-dimensional game world, as well as data describing a view origin and view axis in the game world. 3D data may also include data relating to textures associated with objects to be rendered, shader parameters relating to the objects, and other information affecting how the objects may be displayed. The game, for example during a "render" or "draw" phase, may direct a software and/or hardware "pipeline" to create a rendered scene for presentation on a display as a displayed scene. The presentation can comprise a view of content in the scene. Such content can include digital content, alone or in conjunction with "real world" content (e.g., digital content overlaid on real world content viewed through a transmissive display). A view that includes virtual content can represent what a user observing that content would expect to see. For instance, a first view, presented while a user is at a first orientation, can depict content as it would be seen from the first orientation. If the user rotates to a second orientation, a second view can present the same content as it would be seen from the second orientation—that is, from a perspective that reflects that the user has rotated with respect to the first orientation. In general, it is desirable for the resulting image to reflect a user's expectations about the visual world. In particular, it is generally desirable for a first opaque object closer to the view origin to occlude a second object behind the first object. Objects that are not occluded correctly may confuse the user and may not clearly present where objects lie in the three-dimensional space. In some example computer systems, occlusion is achieved through sorting, in which objects closer to a view origin are sorted, or drawn, on top of objects that are further from the view origin.

Sorting multiple objects for presentation on a display, such that one object realistically occludes another, requires information about relationships among the objects—for example, spatial relationships among the objects in three-dimensional space. Some example computer systems make use of a scenegraph to represent relationships (e.g., hierarchical relationships) among one or more objects, such as objects that are to be rendered as a scene. As used herein, a scenegraph is any data structure that represents such relationships. For example, in a scenegraph, rendered objects to be presented may be represented as nodes in a graph, with relationships among the nodes representing logical or spatial relationships among the objects. A renderer can then traverse the scenegraph, according to techniques known in the art, to render or prepare, for display, at least one of the objects in a manner that will achieve proper occlusion. For example, a renderer may create a scene of objects having nodes; but a corresponding presentation on a display may only be a subset of rendered objects, such that an object occluded by another object in the renderer will only be partially presented in the resultant displayed scene (e.g., such that a non-occluded part of the object is displayed, while an occluded part is not). Such selective display can be beneficial: for example, it can be efficient to occlude a first object running from a first application if only a second object running from a second application needs to be viewable in a given time period. In some examples, a scenegraph is an intermediary data structure that sits between an application that includes 3D data, and a renderer for rendering that 3D data for presentation to a screen: in some examples, the application writes scene information to the scenegraph, and the scenegraph may later be used by the renderer to render the scene or to output the displayed scene.

Figure 2A:
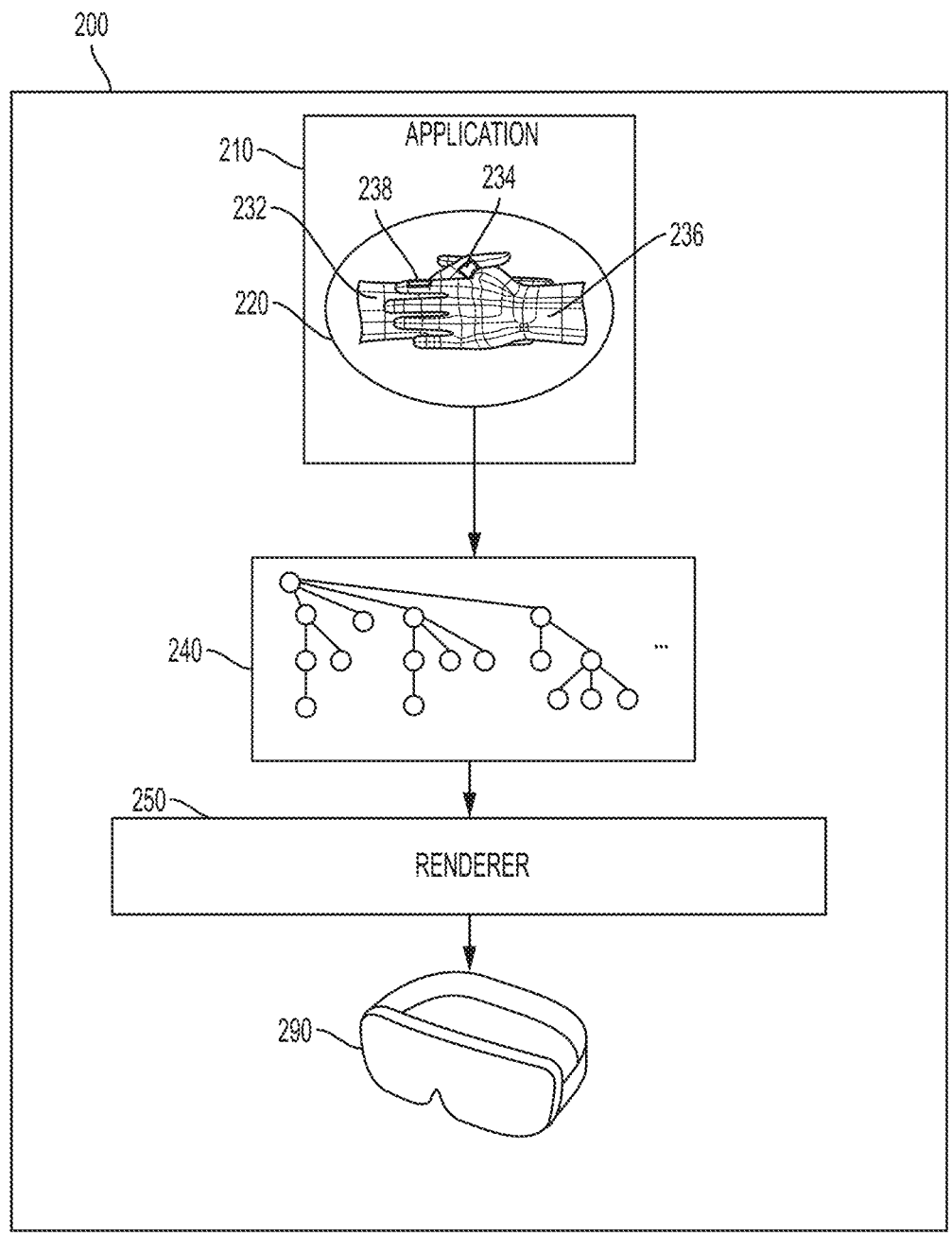
FIG. 2A shows an example flow of data in an example computer system according to examples of the disclosure.

FIG. 2A shows an example flow of data in an example computer system 200. In system 200, a single application 210 can write data to a scenegraph 240, which a renderer 250 can use to render objects 220 for presentation on a display 290. For example, objects 220 may include a number of objects (e.g., polygons) that together comprise a 3D representation of two human hands, hand 232 and hand 236; and the application may direct, for example during a render or draw phase, objects 220 to be presented on the display from the perspective of a view origin oriented along a view axis. In the example, hand 232 and hand 236 are interlocked in a handshake; because of the relative positioning of the hands, the viewer expects some portions of hand 232 to occlude portions of hand 236, and some polygons comprising hand 236 to occlude portions of hand 232, with respect to the view origin and the view axis. Application 210 can write to the scenegraph 240 information describing relationships among objects 220, such as spatial relationships among the polygons comprising objects 220, which can be used to identify which polygons should occlude others—that is, which polygons should be sorted to display on top of others. For example, scenegraph 240 could reflect that polygon 234 (which belongs to hand 232) is positioned between the view origin and the polygons comprising hand 236, and thus should occlude those polygons in hand 236; and that polygon 238 (which belongs to hand 236) is positioned between the view origin and the polygons comprising hand 232, and thus should occlude those polygons in hand 232. Renderer 250 may then output objects 220, or a subset of objects 220 (e.g., only hand 232; only a non-occluded portion of hand 232; or only hand 236) for presentation via display 290 consistent with the desired occlusion.

Figure 2B:
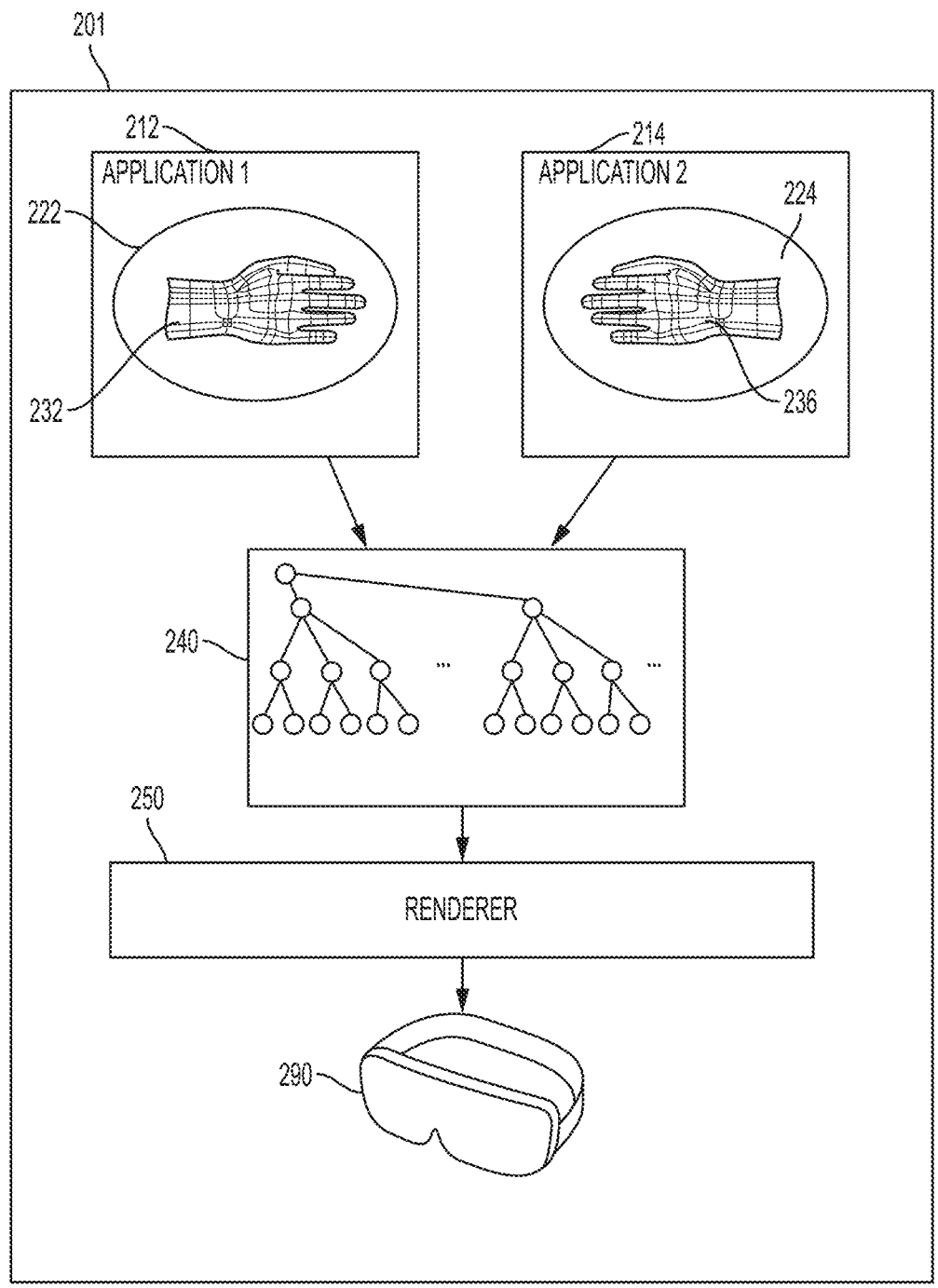
FIG. 2B shows an example flow of data in an example computer system that includes multiple independent applications according to examples of the disclosure.

FIG. 2B shows an example flow of data in an example computer system 201 using two independent applications. When the example of FIG. 2A is extended to render a scene modified by multiple independent applications, as shown in FIG. 2B, rendering problems may occur. For instance, in example computer system 201, application 212 and application 214 both write data to scenegraph 240 to render their respective 3D data to a single display 290. In FIG. 2B, application 212 attempts to render and present objects 222 (which include objects that comprise hand 232); and application 214 attempts to render and present objects 224 (which include objects that comprise hand 236). The example shown in FIG. 2B may have difficulty achieving realistic occlusion of the objects to be rendered: if application 212 and application 214 are independent ("sandboxed") applications, application 212 cannot access data relating to objects 224 of application 214 (including hand 236 and its constituent objects), and likewise, application 214 cannot access data relating to objects 222 of application 212 (including hand 232 and its constituent objects). That is, in some examples, neither application 212 nor application 214 can fully identify the relationships between objects 222 and objects 224. Thus, neither application 212 nor application 214 can write to scenegraph 240 the information that may be necessary to identify which objects occlude others, or in which order the objects should be sorted on the display. In addition, various subsystems, such as for lighting, shadowing, animation, particles, and collision detection, may not behave as expected. The result may be rendered graphical data that is unrealistic, awkward, and confusing. Further, because such rendering systems may not be able to take advantage of rendering optimizations such as culling, these systems may be computationally inefficient.

Centralized rendering, such as described in U.S. patent applications Ser. Nos. 15/940,892 and 16/011,413, provides a solution to such problems that may occur in systems that render 3D data from multiple independent applications. A centralized scenegraph can be used in place of a traditional scenegraph, such as scenegraph 240 in FIG. 2B, in systems (such as example computer system 201 in FIG. 2B) in which multiple independent applications provide 3D data to be rendered. As described herein, in some examples, a centralized scenegraph can include a system that receives 3D data from multiple individual input sources; writes information corresponding to that 3D data to a central location; and maintains that information for access by a renderer that creates a rendered scene comprising objects based on that 3D data. That rendered scene may be used to generate output (such as graphical output) reflecting realistic object occlusion; computational efficiencies; visual effects (such as lighting and shadowcasting); or physical effects (such as collision detection), or partial display of occluded objects that would otherwise be difficult or impossible to realize in systems not utilizing a centralized scenegraph.

In some examples, an example computer system includes a plurality of applications that each include 3D data that represents one or more objects in a common 3D environment. Each of the plurality of applications may exist in a "sandboxed" environment, such that it remains agnostic of other applications: for example, the data of each respective application may be independent of the data of each other application; each application may not have access to the data of each other application; and while 3D data of each of the applications may correspond to the same 3D environment, each application maintains its own instance of the 3D environment. For example, each application may represent a player in an online multiplayer video game, where each player exists in an instance of the same game world, or 3D environment, but lacks direct access to data of other players. It may be desirable in such examples for all players to be rendered simultaneously in a single instance of the game world, but it may be undesirable (or computationally prohibitive) for each player to maintain the information necessary to render the 3D data of each other client participant. Further, it may be desirable for security purposes to limit the information of a player that is available to other players.

In some examples, each of the plurality of sandboxed applications can independently write information corresponding to its 3D data to a local scenegraph, which information is later written to a common centralized scenegraph. The centralized scenegraph can then be traversed by a renderer, to render a scene for presentation on a display as an image based on the collective 3D data provided by each application. By communicating the 3D data from each of the plurality of sandboxed applications to a single centralized scenegraph, the renderer can apply beneficial techniques such as occlusion, lighting effects, and rendering optimizations (such as surface culling) that require or benefit from simultaneous knowledge of the 3D data of all applications. These benefits are realized while limiting the computational overhead required of each sandboxed application: from the perspective of a single application, all the application needs to do is update a single scenegraph to reflect its 3D data, with other operations performed by another component of the system. Further, security benefits can be obtained by maintaining separation between the sandboxed applications.

Figure 3A:
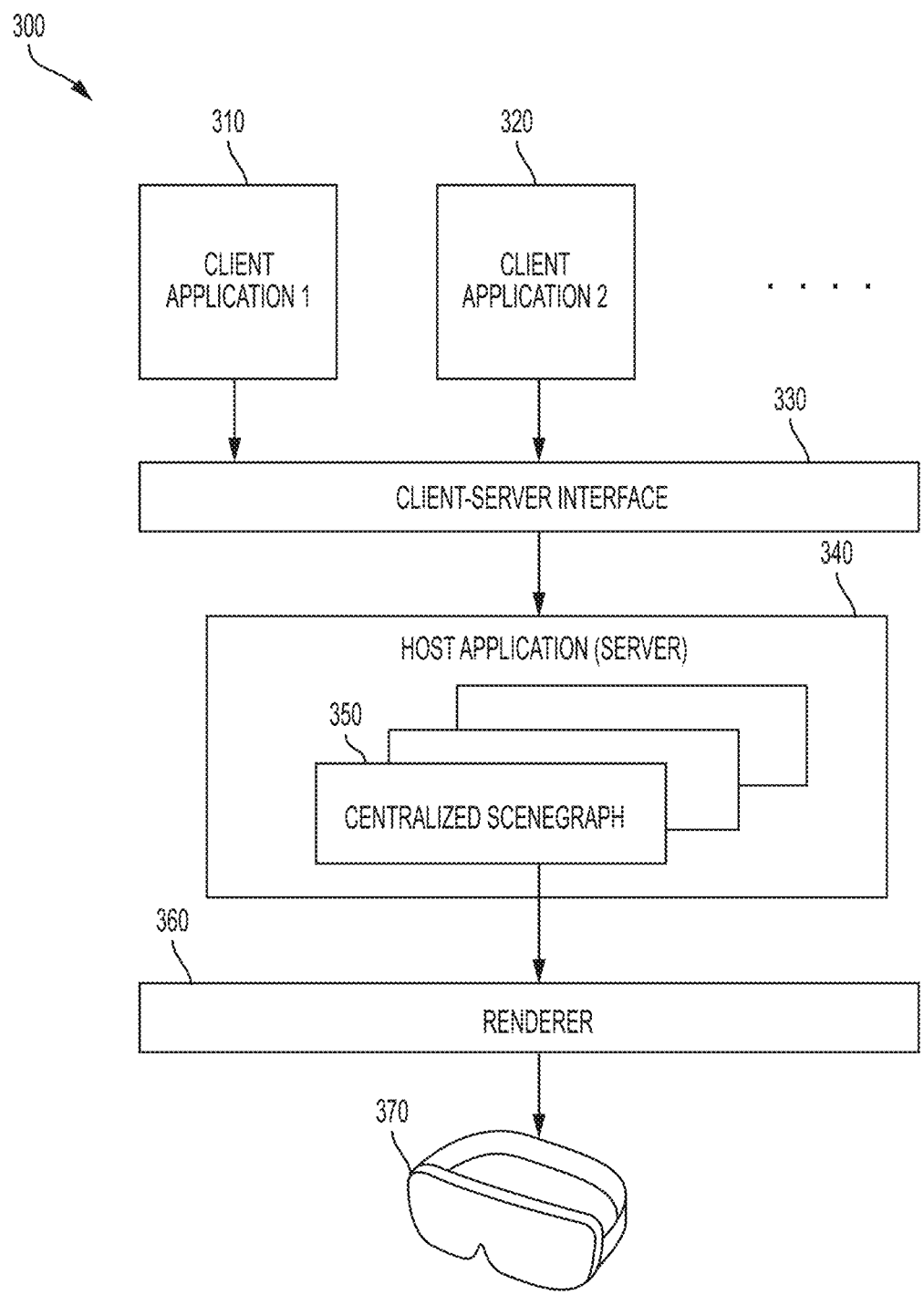
FIG. 3A illustrates components of an example computer system that can render 3D data from multiple independent applications to a display using a centralized scenegraph according to examples of the disclosure.

FIG. 3A illustrates components of an example computer system 300 that can render 3D data from multiple independent applications to a display using a centralized scenegraph. The example illustrated utilizes a client-server topology; however, the disclosure is not limited to client-server examples. In example computer system 300, a first client application 310 and a second client application 320 each communicate 3D data (in some examples, over a network) to a client-server interface 330. In some examples, client applications 310 and 320 are "sandboxed" applications that operate independently of each other, and independently communicate their 3D data to a client-server interface 330. Client-server interface 330 can receive updated 3D data from client applications 310 and 320, and communicate that 3D data (in some examples, over a network) to a server-side host application 340. In some examples, client-server interface 330 uses multi-threading techniques to receive, process, and/or communicate 3D data to the host application 340 using multiple processor threads. In some examples, the client-server interface includes logic to control (such as by throttling) the rate at which 3D data is communicated to the host application 340. Host application 340 can use the 3D data received from the client-server interface to update centralized scenegraph 350, such that centralized scenegraph 350 reflects the 3D data received from client applications 310 and 320. In some examples, centralized scenegraph 350 comprises multiple versions of scenegraphs, and known versioning techniques are used to allow updates to the centralized scenegraph 350 to occur in parallel. Renderer 360 can then traverse the centralized scenegraph 350, apply optimizations and effects as appropriate, and generate an output (e.g. a graphical output comprising data of at least one of client applications 310 and 320, and in some embodiments only the occluded portion of one client application without the occluding application data) to be displayed on a display 370, such as a computer monitor.

Figure 3B:
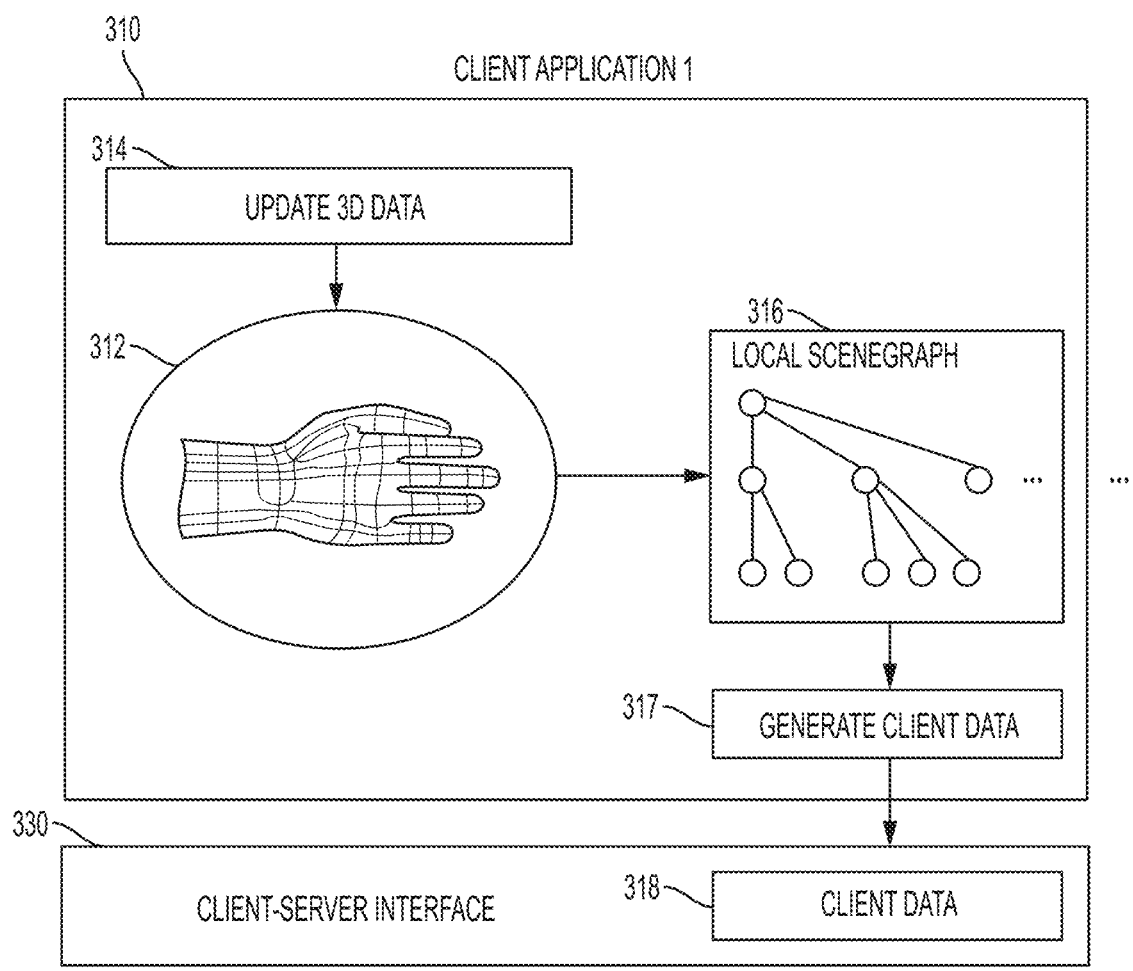
FIG. 3B illustrates aspects of an example client application with respect to an example computer system that includes multiple independent client applications according to examples of the disclosure.

FIG. 3B illustrates aspects of an example client application 310 with respect to example computer system 300 shown in FIG. 3A. In the example shown, 3D data 312 represents graphical objects (such as geometric primitives, e.g., polygons), in a 3D environment, that are to be presented on a display 370. 3D data 312 may be updated (314) by client application 310. For example, if client application 310 is an application with a rendering loop that iterates sixty times per second, client application 310 may update 3D data 312 sixty times per second to reflect changes to that data during the application's course of operation that should be reflected in rendering output. In some examples, 3D data 312 is represented as a local scenegraph 316, which may be local to each client application 310. In some examples, local scenegraph 316 may include data (such as nodes) that correspond to data in centralized scenegraph 350. As 3D data 312 is updated (314), client application 310 can update local scenegraph 316 to reflect the most recent version of 3D data 312. As local scenegraph 316 is updated, it can be used by client application 310 to generate (317) client data 318. In some examples, client data 318 may represent local scenegraph 316 in its entirety. In some examples, client data 318 may represent changes made to local scenegraph 316 since the previous client data 318 was sent to client-server interface 330. For example, client data 318 might include nodes that were added to or deleted from local scenegraph 316; changes to relationships between nodes in local scenegraph 316; or changes to properties of nodes in local scenegraph 316. In some examples, client data 318 may use identifiers, such as identification numbers corresponding to scenegraph nodes, to identify relationships between data from local scenegraph 316 and corresponding data on centralized scenegraph 350. Client data 318 can then be communicated to client-server interface 330, for eventual communication to host application 340. In some examples, communication of client data 318 to client-server interface 330 may occur over a network. In some examples, a client helper application may be used in conjunction with client application 310 to generate client data 318 from local scenegraph 316, or from 3D data 312.

The aspects described with respect to client application 310 may similarly describe client application 320, or other client applications that (along with client application 310) comprise example computer system 300. It will be appreciated by those skilled in the art that the systems and methods described herein can be extended to include any number of client applications and client data, and the disclosure is not limited to any such number; further, some benefits (e.g., improvements in computational efficiency) may become more apparent with an increasing number of client applications. As described above, client applications 310 and 320 may be sandboxed applications that do not share data or functionality. For example, in example computer system 300, client application 320 may have its own 3D data and local scenegraph, independent of 3D data 312 and local scenegraph 316, belonging to client application 310. In some examples, however, including example computer system 300, a single client-server interface 300 is shared by multiple client applications, such as client applications 310 and 320.

While the above examples are described with respect to 3D data, the disclosure is not limited to three dimensional data, or to data in a 3D environment. The above examples can be generalized to graphical data of an arbitrary number of dimensions, including 2D graphical data.

Figure 3C:
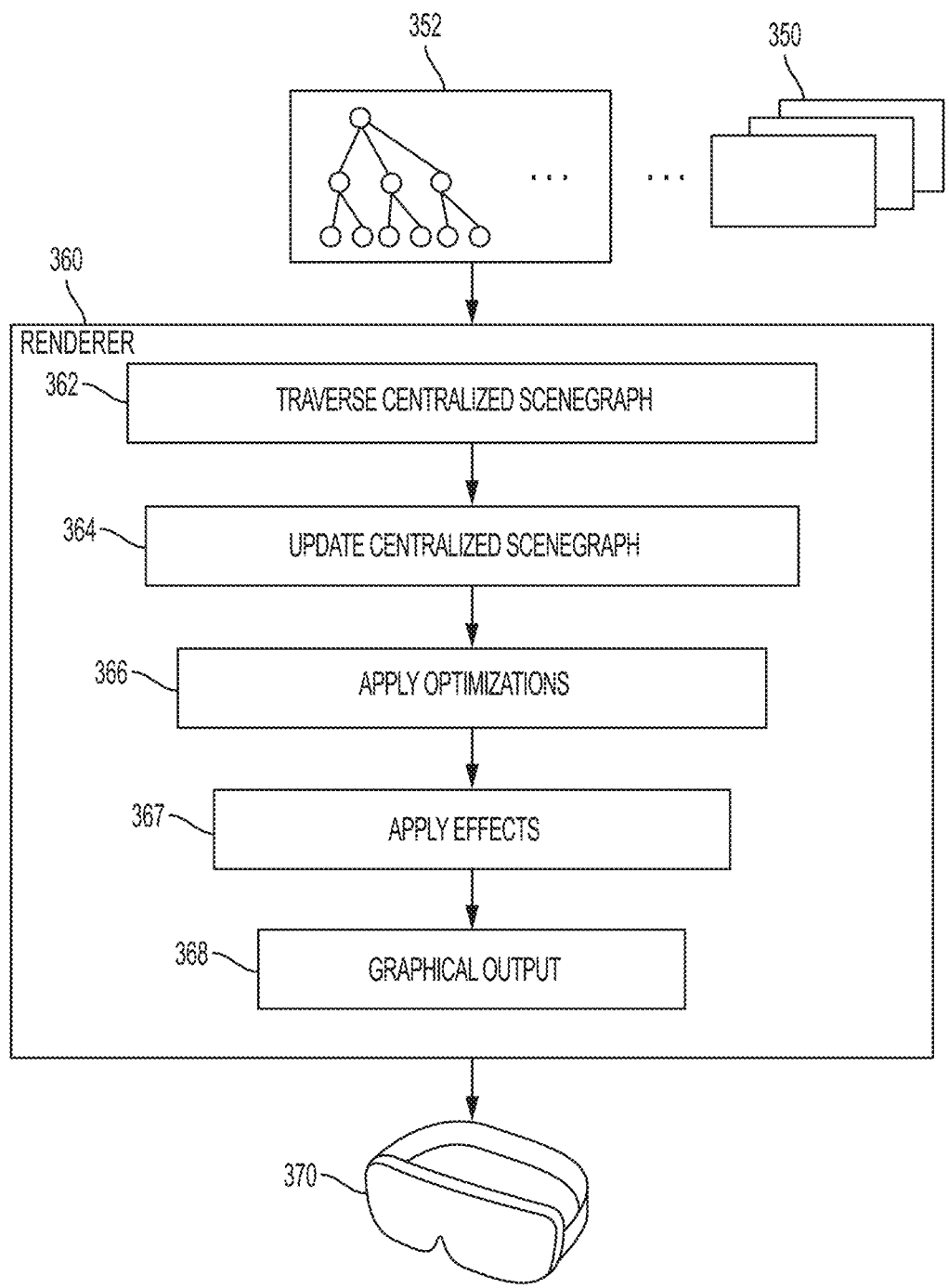
FIG. 3C illustrates aspects of an example renderer with respect to an example computer system that includes multiple independent applications according to examples of the disclosure.

FIG. 3C illustrates aspects of an example renderer 360 with respect to example computer system 300 shown in FIGS. 3A and 3B. In some examples, renderer 360 comprises part of host application 340. In some examples, renderer 360 may be part of another component of example computer system 300, or may be a separate component or application. In some examples, renderer 360 may be implemented in different physical hardware from one or more components of example computer system 300, and may communicate with one or more of those components over a network.

In the example shown in FIG. 3C, renderer 360 operates on a version 352 of centralized scenegraph 350. In the example, a role of the renderer is to create a rendered scene comprising data such as output or graphical output for presentation on a display 370 based on version 352 of centralized scenegraph 350. As part of this process, renderer 360 may traverse (362) version 352, using known scenegraph traversal techniques. During or after traversal 362, renderer 360 may update (364) the centralized scenegraph 350 as appropriate to reflect the results of the traversal. For example, as part of traversal 362, renderer 360 may identify orphaned nodes that should be deleted from the centralized scenegraph 350. Following traversal 362 and/or update 364, renderer 360 may apply various optimizations 366 to the scene. For example, renderer 360 may cull obscured or invisible surfaces to avoid expending unnecessary computational resources. Following traversal 362 and/or update 364, renderer 360 may apply one or more visual effects 367 to the scene. For example, in some examples, renderer 360 may apply lighting effects or shadow effects; apply one or more shaders; apply particle effects; and/or apply physical effects. Finally, renderer 360 can output data to a graphical output pipeline, the result of which can display the output on display 370.

In some cases, optimizations may be applied to the systems and methods described above to reduce the size of the scenegraph data, e.g., the amount of scenegraph data to be transmitted over a computer network (such as via client-server interface 330). For example, where the scenegraph includes nodes (or referenced assets) that may not be visible to a rendered graphical output, those nodes may be excluded from the scenegraph data to be transmitted. Similarly, assets can be unloaded when nodes that reference them are removed from the scenegraph. Further, to improve performance, nodes can be inserted only when they need to be rendered, avoiding the overhead of including nodes in scenegraph data when they may have no apparent effect on a rendered scene (e.g., where the absence of a node may be imperceptible to a user).

In some cases, varying levels of detail (LODs) can be applied to assets to reduce the overall data size. Varying LODs can help ensure that assets are not more data-intensive than warranted in a particular viewing context. For example, low-resolution images can be substituted for higher resolution images when the anticipated display size does not warrant the data size of the higher resolution images. This can improve system performance, for example by reducing the amount of network bandwidth required to transmit larger assets (e.g., higher resolution images) than necessary.

Application Sharing

Examples of the systems and methods disclosed herein can be used to allow multiple clients to share (e.g., view and interact with) content of a common software application executing on a single host client. This can be desirable to avoid the need to install the software application on each remote client in communication with the host client; further, this can be desirable to synchronize inputs and control information across multiple users of an application. This can be advantageous in examples where clients have limited computing resources (e.g., disk storage); or where users may lack the time, sophistication, or willingness to install the software application. Similarly, a software provider may wish to encourage users to use a software application by reducing the number of steps required to interact with that application (e.g., by allowing users to share another user's version of that application). Further, systems and methods disclosed herein can minimize network bandwidth usage by rendering content locally at each remote device—for example, by leveraging the centralized rendering systems and methods described above—rather than by transferring video output from a host device to a remote device. In some examples, a computing device for hosting, sharing, viewing, or interacting with a software application may correspond to a head-mounted display device, such as corresponding to the example device illustrated in FIG. 1E described above; shared content may be displayed on a display of the head-mounted device; and users may interact with the shared software application via sensors or input devices of the head-mounted device.

Figure 4A:
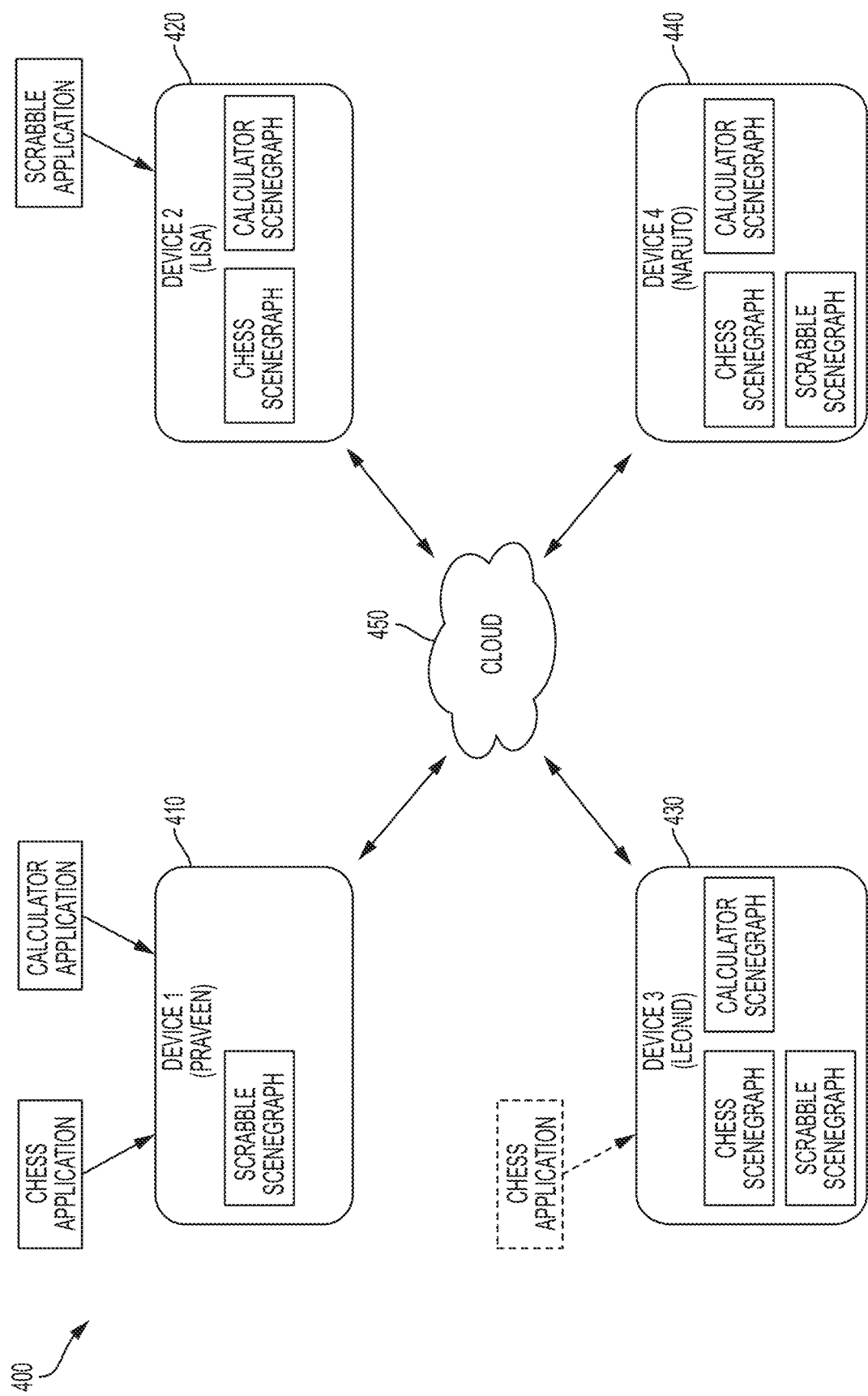
FIGS. 4A-4B illustrate example diagrams of systems for application sharing according to examples of the disclosure.

FIG. 4A illustrates an example system 400 for implementing examples of the application sharing described above. In the figure, four users (Praveen, Lisa, Leonid, and Naruto) of four respective computing devices (410, 420, 430, and 440) wish to share three separate software applications (Chess, Calculator, and Scrabble), where each application executes on only one of the client computing devices. System 400 includes a server 450, which in some examples may correspond to a cloud server. In example system 400, each of computing devices 410, 420, 430, and 440 is in communication with server 450, but is not necessarily in direct communication with the other computing devices.

In example system 400, each of the three software applications (Chess, Calculator, and Scrabble) executes on one of client computing devices 410, 420, 430, or 440, but can be viewed and/or interacted with by each of the client computing devices on which it is not executing. For example, as shown in the figure, the Chess application is executing on device 410; and each of device 420, 430, and 440 is able to view the Chess application by rendering a Chess scenegraph local to the respective device. (Scenegraphs can be rendered on a display preferably using centralized rendering systems and methods, such as described above.) Similarly, in the example, the Calculator application is shown executing on device 410, concurrent with the Chess application, and each of device 420, 430, and 440 is able to render a view of the Calculator application via a Calculator scenegraph local to the respective device. In addition, in the example, the Scrabble application is shown executing on device 420, and each of device 410, 430, and 440 is able to render a view of the Scrabble application via a Scrabble scenegraph local to the respective device. As such, each of the four devices 410, 420, 430, and 440 is able to view each of the three applications: either by executing the application locally (as in device 410 executing the Chess application and the Calculator application), or by rendering a view from a local scenegraph (as in device 430 storing a local scenegraph for each of the Chess application, the Calculator application, and the Scrabble application). Server 450 operates to exchange data among devices 410, 420, 430, and 440, as described below. In some examples, such as described below, server 450 can maintain its own local copy of a scenegraph corresponding to each application (e.g., Chess, Calculator, Scrabble); this can provide a base scenegraph for devices joining a preexisting application sharing session.

In example system 400, a host system executes an application (e.g., device 410 executes the Chess application) and shares it with one or more remote devices (e.g., devices 420, 430, and 440). It may be advantageous for the remote devices to view and interact with the shared application without installing the application on the device itself. For example, in the example shown, remote devices 420 and 440 do not have the Chess application installed; when initiating a sharing session, device 410, which hosts the Chess application, can provide remote devices 420 and 440 with necessary data, such as required assets. However, in some examples, the overhead of providing such data can be reduced or avoided by installing such data on the remote device. For instance, in the example shown, remote device 430 has the Chess application installed on the device in advance of joining the sharing session, which can eliminate the need for device 410 to provide remote device 430 with assets and other data for the Chess application. However, in the example, the Chess application is not executed on remote device 430 (i.e., by a processor of remote device 430)—it is executed on device 410, with remote device 430 relying on its own local installation of the Chess application for required application data, during initialization for example.

Figure 5:
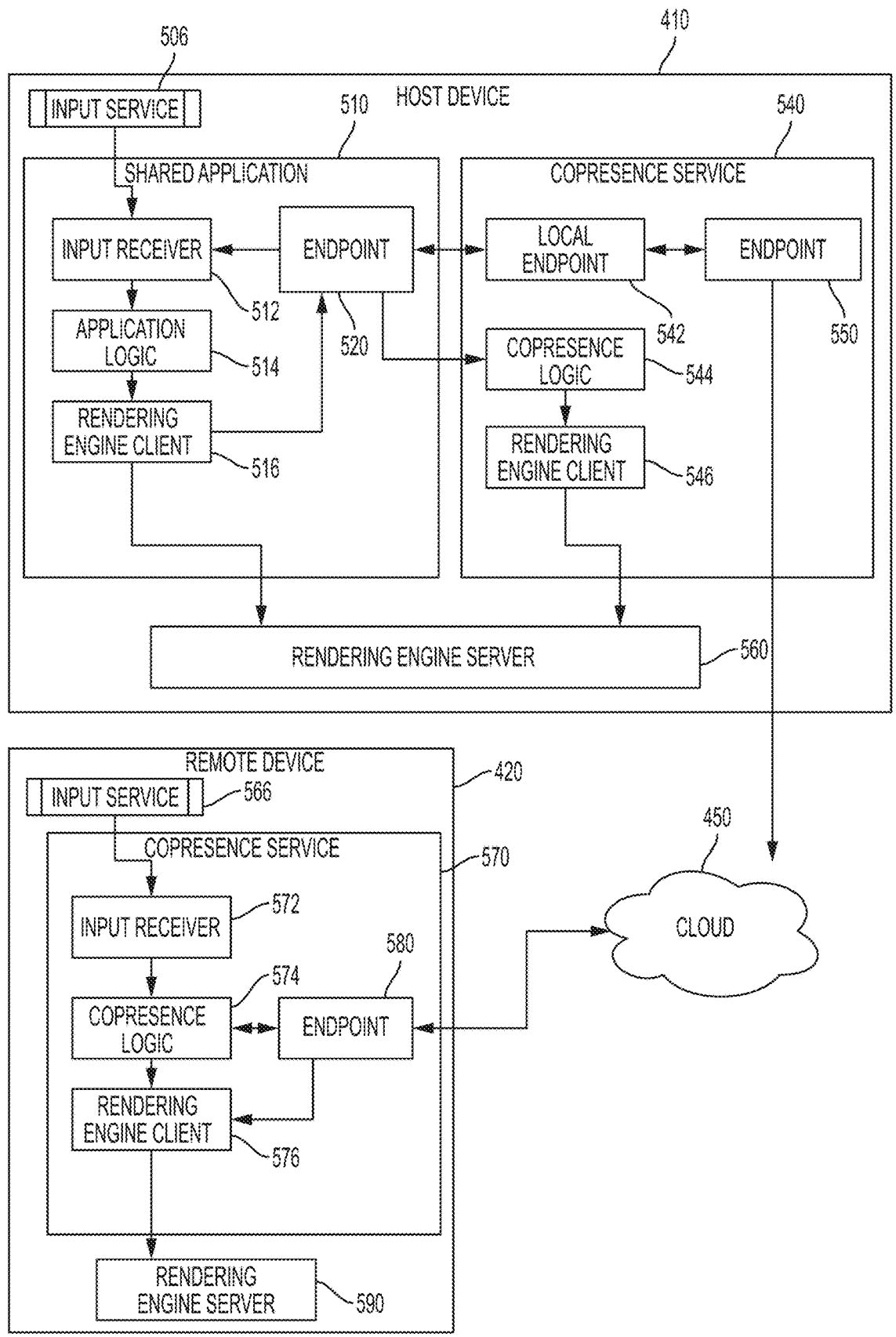
FIG. 5 illustrates an example diagram of a system for application sharing according to examples of the disclosure.

FIG. 5 illustrates an example of a host device (e.g., device 410) executing an application 510 (e.g., Chess) and sharing the application with a remote device (e.g., device 420), such that a user of the remote device can view and interact with the application, such as described above with respect to example system 400. As noted above, the remote device need not install the application: for instance, at the start of an application sharing session, the host device may provide the remote device with required initialization data, such as required assets (e.g., textures, model data, audio files, particle effects, animation data), without the need for the remote device to perform a separate installation procedure. While the application is being shared, the host device may provide the remote device with application state data and/or one or more scenegraphs, such as described below. In some examples, the remote device may provide the host device with input data (e.g., representing button inputs, gesture inputs, touch inputs); user data (e.g., a user's identity details, activity history, and/or social media presence information); and/or sensor data (e.g., GPS coordinates, camera data, microphone data). In FIG. 5, application 510 represents an application executing on host device 410. In some examples, multiple applications may execute concurrently on device 410, such as the Chess and Calculator applications shown executing on device 410 in FIG. 4A; while the example shown describes a single shared application, it can be extended to multiple shared applications. In some such examples, the host device may maintain and share two or more independent scenegraphs (e.g., three scenegraphs, each corresponding to one of three shared applications). As noted above, in some examples, a single scenegraph may correspond to two or more applications (e.g., a single scenegraph corresponding to Chess and Scrabble). Further, as described herein, while remote device 420 is remote with respect to host device 410, it need not be physically or electronically separated from host device 410. In some examples, remote device 420 may be physically or electronically connected to host device 410, or may be components or modules of a single physical device. In this way, application sharing can be implemented at a platform level. For example, applications can be shared among components or regions of a single platform, such as a mobile device operating system (e.g., iOS, Android) or an operating system for a head-worn device. In some examples, applications can be shared in this manner across platforms; this can enable, for instance, behavior in which an application is shared between a user of a first platform (e.g., a mobile device running iOS) and a user of a second, different platform (e.g., a head-worn virtual reality system running a custom operating system).

Copresence service 540 is a helper application that enables a primary application to be shared with a remote device. In the example, copresence service 540 executes on host device 410, concurrently with application 510 and sandboxed with respect to application 510, and enables application 510 to be shared with remote device 420. In some examples, as described below, each device with which application 510 is shared (e.g., devices 420, 430, 440 in FIG. 4A) can execute a respective copresence service application. For instance, in the example shown in FIG. 5, remote device 420 executes its own remote copresence service 570, which can comprise some or all of the features of host copresence service 540. For example, remote copresence service 570 can comprise a main logic loop 574 and a remote rendering engine client 576.

In the example shown, host copresence service 540 incorporates transport functionality for sending and receiving data (e.g., graphical data, input data) to and from remote devices (e.g., 420) via cloud server 450. For instance, in the example, local endpoint 542 can act as a terminal for exchanging data with application 510, and endpoint 550 can act as a terminal for exchanging data with cloud server 450. In the example, host copresence service 540 further comprises a main application logic loop 544, which can perform various functions associated with host copresence service 540. These functions can include mediating the exchange of data between host device 410 and remote devices; adding and removing remote devices from sharing application 510; user interface functions (which may include "avatar" functionality to represent remote users); chat functionality; file transfer (e.g., exchanging data, including assets associated with application 510, between host device 410 and remote devices, such as remote device 420); and/or generating graphical output. Graphical output of the copresence service 540 (which may include a scenegraph) can be presented to rendering engine client 546, which in some examples can correspond to client-server interface 330 described above with respect to FIG. 3A and FIG. 3B. Rendering engine client 546 can then present graphical data to rendering engine server 560 (which in some examples can correspond to server 340 described above with respect to FIG. 3A and FIG. 3B) to be rendered on host device 410 (e.g., as described above with respect to process 360 shown in FIG. 3C). However, in some examples, copresence service 540 may include only limited features, and may be a background process that executes without any user input or display output.

Referring to the example shown in FIG. 5, application 510 can comprise an input receiver 512, which can receive and handle host input 506 from device 410 (e.g., via an input service associated with device 410). Host input 506 can comprise input received via a conventional input device, such as a keyboard or a mouse; via sensors of a head-mounted device (e.g., cameras, eye tracking sensors, microphones); via handheld input peripherals; or by any other suitable device. In some examples, input 506 may be provided by one or more sensors or input devices associated with a head-mounted augmented reality device. In some examples, input receiver 512 can receive input provided by a remote device, such as described below, instead of or in addition to host input from host device 410.

Application 510 can further comprise a main application logic stage 514. Input received by 512 can be provided as input to the application logic stage 514. Application logic stage 514 can include a main application loop that accepts input, executes application logic (e.g., the game logic for a Chess application), maintains some application state, and provides some output (e.g., display output). Application logic stage 514 can comprise determining a scenegraph of the application for host device 410, and for each remote device (e.g., remote device 420) with which the application is shared; in some examples, one or more of the local device and the remote devices may share the same scenegraph. Example graphical processes performed by application logic stage 514 are described above with respect to client application 310 shown in FIG. 3B. However, the present disclosure is not limited to any particular application or to any particular application logic 514.

Application 510 can further comprise a rendering engine client 516, which in some examples can correspond to client-server interface 330 described above with respect to FIG. 3A and FIG. 3B. In some examples, rendering engine client 516 may be the same as, or may share common components with, rendering engine client 546 described above. From application logic stage 514, display data of the application logic can be provided to rendering engine client 516, for example such as described above with respect to FIG. 3A and FIG. 3B. Rendering engine client 516 can be a client-side utility, local to host device 410, that generates one or more scenegraphs, each scenegraph corresponding to application 510, based on the output of application logic stage 514. In some examples, application 510 can generate a scenegraph for each device (e.g., 420) with which application 510 is to be shared. Such scenegraphs may be identical, or may be unique to one or more of the devices. In some examples, scenegraphs may be optimized on a per-remote-device basis, such as by only including the data needed by each remote device. For example, a remote device 420 could provide host device 410 with data indicating a field of view and camera origin of a user of remote device 420; host device 410 can accordingly compute which elements of a scenegraph may be visible to the user of remote device 420 (i.e., which elements may be visible in a view corresponding to the camera origin and field of view); and prune invisible elements from the scenegraph for remote device 420. Similar optimizations may also be performed based on information regarding which elements of a scenegraph may be visible on a remote device (e.g., level of detail settings, or layering information, on the remote device).

To present a view of application 510 to a local user of host device 410 (e.g., representing the user's view of the application), rendering engine client 516 can generate a scenegraph corresponding to the local user's view, and then present the scenegraph and associated content to a rendering engine server 560, which may display the corresponding view of the application 510 on a display of device 410. This process may correspond to that described above with respect to FIG. 3A and FIG. 3B. Rendering engine client 516 may, but need not, present a scenegraph and associated content directly to rendering engine server 560. In some examples, rendering engine client 516 can present the scenegraph and content to an endpoint, socket, pipe, or any other suitable inter-process communication mechanism for presentation to rendering engine server 560.

In some examples, rendering engine server 560 may be local to host device 410; in some examples, rendering engine server may be on a remote device, such a dedicated server, or on another device connected to device 410, such as in a peer-to-peer network. Neither the rendering engine client 516 nor the rendering engine server 560 need be dedicated hardware modules; in some examples, the rendering engine client 516 and/or the rendering engine server 560 may be purely software modules, such as separate applications (e.g., separate applications running concurrently on a single platform), or separate threads of a multithreaded application. In some examples, however, one or more rendering engine functions (e.g., those performed by renderer 360 shown in FIG. 3C) may be performed on dedicated hardware, such as a dedicated server and/or dedicated graphics processing hardware (e.g., a GPU). By performing computationally intensive functions on dedicated hardware, computing resources can be freed up on user devices (e.g., device 410). This may be particularly valuable when user devices comprise mobile hardware (e.g., mobile phones, headsets) on which battery life, computational resources, and physical space are at a premium.

Rendering engine server 560 can include a centralized scenegraph and renderer, such as described above. In some examples, multiple client applications (e.g., a Chess application and a Calculator application executing concurrently on device 410) can simultaneously provide content and/or scenegraph data to the rendering engine server 560. Further, in some examples, the rendering engine server 560 includes no client application code, and may be agnostic to the particular source of such data presented to it by rendering engine client 516. This can permit its use with diverse applications, such as the Chess and Calculator applications described above, without the need for the rendering engine server to comprise custom logic for each such application. Likewise, this can permit applications such as the Chess and Calculator applications to cooperate with the copresence service to enable application sharing functionality without any custom programming—encouraging the production, adoption, and use of such applications.

In the example shown in FIG. 5, rendering engine client 516 can provide graphical data to host copresence service 540. In some examples, this graphical data can be provided to an endpoint (e.g., endpoint 520), or to a socket or another suitable inter-process communication mechanism. The graphical data can comprise remote graphical data intended for presentation to remote device 420. For example, the remote graphical data can include a scenegraph, or partial scenegraph, corresponding to application 510, to be rendered and displayed on remote device 420. For such remote graphical data, endpoint 520 can provide that remote graphical data to another endpoint 550, corresponding to the remote device; from endpoint 550, the data may be communicated to remote copresence service 570 executing on remote device 420 (e.g., via cloud server 450, and/or a remote endpoint 580 corresponding to the remote copresence service).

In some examples, once the remote graphical data (e.g., including a scenegraph) is received at remote copresence service 570, it can be provided to the main logic loop 574 of the remote copresence service, which can use the remote graphical data to determine a view to be rendered on the remote device 420. For example, remote copresence service 570 can generate and update a local scenegraph, such as described above. In some examples, the remote graphical data can be provided directly to the rendering engine client 576. Rendering engine client 576 can then provide data to rendering engine server 590, where it can be rendered to a display, such as a display of device 420.

In some examples, remote device 420 cannot interact with application 510, instead acting as a spectator who merely renders a view of the application. In other examples, however, remote device 420 can interact with application 510, such as via input provided to remote device 420. In some cases, this input can affect the remote device's view of application 510 (e.g., by adjusting display parameters), without communication back to host device 410. In some examples, though, remote device 420 can provide input back to host device 410, which can be passed as input to application 510 executing on host device 410. For instance, if application 510 is a Chess application, remote device 420 may provide host device 410 with user input indicating the user's desired chess move. In the example shown, remote copresence service 570 comprises a remote input receiver 572, which receives input (e.g., via an input service 566) of remote device 420. Remote input receiver 572 and input service 566 can correspond to input receiver 512 and input service 506, respectively, described above with respect to host device 410. For example, remote input receiver 572 can receive input provided via conventional input devices (e.g., keyboards or mice); via sensors of a head-mounted device; via handheld input peripherals; or by any other suitable device. This input data can be provided as input to main loop 574 of the remote copresence service 570.

In examples where the input data affects the remote device's view of the application, without affecting the execution of the application itself, main loop 574 can determine how the input data should affect the view of the application, and present corresponding graphical data to rendering engine client 576 (which in turn provides graphical data to rendering engine server 590). In examples where the input data is communicated back to host device 410, main loop 574 can present the data to endpoint 580, which can communicate the data to endpoint 550 of host copresence service 540. From here, the data can be communicated back to application 510 (e.g., via endpoints 542 and 520, and input receiver 512), where it can be presented as remote input to main application logic loop 514. Application logic loop 514 can then incorporate the remote input into an updated scenegraph of application 510; for example, in a Chess application, application logic loop 514 can update the game state, in accordance with user input received from the remote device, to move the chess pieces accordingly; and generate a new scenegraph reflecting the updated position of the chess pieces. The updated scenegraph can then be presented to remote device 420, such as via the mechanisms described above. In this way, remote device 420 is able to provide input to application 510, and receive an updated scenegraph that takes the remote device's input into account.

The graphical data provided by rendering engine client 516 can also comprise host graphical data, intended to be rendered and presented on host device 410, instead of or in addition to the remote graphical data described above. This host graphical data can be presented via endpoint 520 to host copresence service 540, e.g., as input to main loop 544. This graphical data can then be presented to a rendering engine client 546 of the host copresence service 540; from here, it can be presented to the host rendering engine server 560. Rendering engine server 560 can render a single view that incorporates graphical data from two sources, such as described above: for example, graphical data corresponding to local application 510, and also graphical data corresponding to host copresence service 540.

While the example shown in FIG. 5 illustrates a single application 510 executing on a host device and being shared with a remote device, the example can be extended to multiple applications executing on a host device and being shared with a remote device. As noted above, graphical data for such multiple applications may be represented by a single scenegraph (e.g., one scenegraph corresponding to two applications), or by two or more scenegraphs (e.g., two scenegraphs, each corresponding to one application). Further, the remote device 420 described in the example shown in FIG. 5 may also execute its own additional applications, which it may share with other devices (including device 410). For example, FIG. 4A shows device 420 executing a Scrabble application, which is shared with device 410. In such examples, remote device 420 may be considered a host device with respect to those applications which it executes. Other configurations of devices and shared applications will be evident, and the disclosure is not limited to any particular such configuration. For instance, applications may be shared among applications running on a single platform (e.g., iOS), among applications running on different platforms (e.g., iOS and Android), or some combination.

Figure 6:
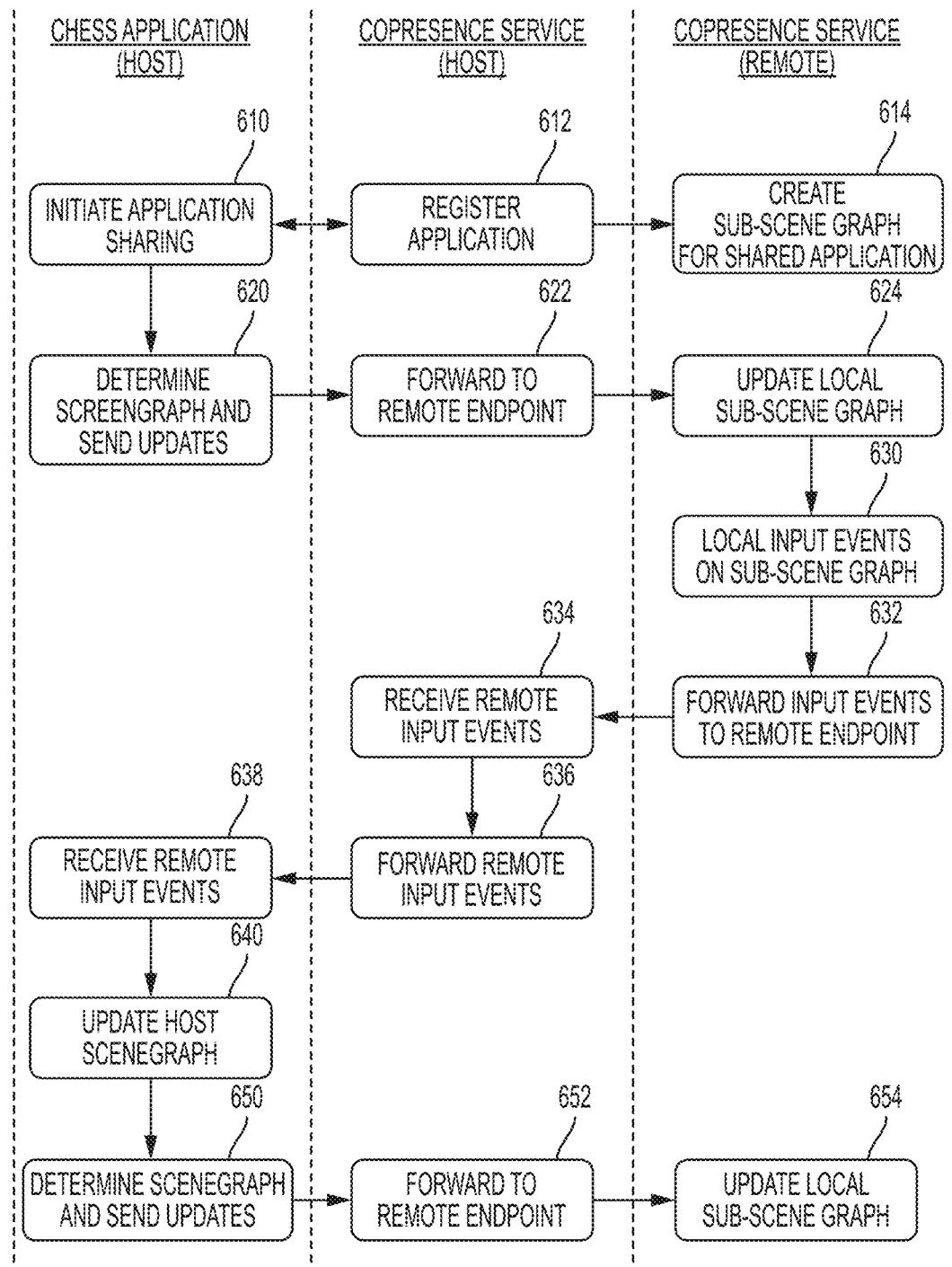
FIG. 6 illustrates an example flow chart of application sharing according to examples of the disclosure.

FIG. 6 shows a flow chart illustrating an example flow of data between a host device (e.g., device 410 in FIG. 4A and FIG. 5) executing an application (e.g., application 510 in FIG. 5, which may be a Chess application) and a remote device (e.g., device 420 in FIG. 4A and FIG. 5) which shares that application according to the disclosure. (As used with respect to this example, "host" refers to processes and data local to host device 410, which is the device that executes the application 510 in the sharing session, and "remote" refers to processes and data remote to device 410, such as processes and data at device 420. Device 420 may have application 510 downloaded or installed, but is not executing it in the sharing session.) In the example process described in FIG. 6, a user of the remote device can view and interact with the application, without the need for the application to be installed on the remote device. At stage 610 of the example, a user of host device 410 initiates sharing of application 510. Application sharing can be initiated using any suitable technique, such as described further below for example via interacting with a "share" option presented via a context menu or system dialog of host device 410. (In some examples, a user of the remote device, not the host device, may initiate sharing the application.) In response, at stage 612, a host copresence service executing on device 410 (e.g., host copresence service 540) registers application 610 for sharing and performs any necessary initialization. The host copresence service communicates (e.g., via server 450) to a remote copresence service (e.g., remote copresence service 570 executing on device 420) that application 510 is being shared. (In some examples, such as where the remote device does not have application 510 downloaded or installed, this stage may comprise sending required assets, or other application data, to the remote device.) In response, at stage 614, the remote copresence service can create a remote scenegraph (or, as in the example, a sub-scenegraph), local to remote device 420, corresponding to application 510. As described above, a rendering engine server executing on (or in communication with) remote device 420 can render this remote scenegraph, such as described above with respect to FIGS. 3A-3C, and provide display output (e.g., on a display of device 420) corresponding to a view of application 510 belonging to a user of device 420.

At stage 620, host device 410 can determine a scenegraph for application 510 that should be presented to device 420 (e.g., a 3D camera view of application 510 corresponding to a camera position of a user of device 420), such as described above, and sends data reflecting the scenegraph to host copresence service 540. At stage 622, upon receiving the data reflecting the scenegraph, host copresence service 540 forwards the data to the remote copresence service 570, for example via server 450 using a remote endpoint, socket, or other suitable mechanism for communicating data. At stage 624, upon receiving the data reflecting the scenegraph, remote copresence service 570 updates or replaces (e.g., via rendering engine client 576) the remote scenegraph created at stage 614 as described above. This remote scenegraph can then be rendered at device 420 via rendering engine server 590, such as described above. By only communicating this updated data from the host device to the remote device, bandwidth usage is limited compared to sending raw image data (e.g., video frames) or other storage-intensive data.

Device 410 can repeat the process at stage 620 for additional devices, such as remote device 430 and 440, and including the host device 410. For each respective device, rendering engine client 516 can determine a scenegraph of application 510 that should be presented to that device, such as described above. For a scenegraph to be displayed on host device 410, rendering engine client 516 can generate or update a scenegraph, and present it to rendering engine server 560 for rendering, such as described above with respect to FIGS. 3A-3C.

In examples where remote device 420 interacts with application 510 via providing input—rather than just passively displaying a view of application 510—remote copresence service 570 at stage 630 can accept input from remote device 420, for example via remote input receiver 572 in communication with an input service 566 (whose behavior may correspond to host input receiver 512 and input service 506 as described above). At stage 632, remote copresence service 570 can forward input event data to host copresence service 540, who receives the input event data at stage 634. At stage 636, host copresence service 540 can forward the input event data to local application 510, where it can be received at stage 638 (e.g., by input receiver 512) and provided as input to application logic 514.

At stage 640, application logic 514 can update the host scenegraph in accordance with host input received from host device 410, such as described above, and in examples where remote devices (e.g., remote device 420) provide input, application logic 514 can additionally incorporate that remote input when updating the scenegraph. For example, if application 510 is a Chess application and remote input received by application 510 at stage 630 corresponds to a user of remote device 420 moving a chess piece, application 510 can update the game state accordingly (which could affect the data presented to all devices sharing the application, as well as host device 410); and generate a corresponding updated scenegraph reflecting the new game state (e.g., with the chess piece in its updated position on the chessboard).

At stage 650, host application 510 sends updates to remote device 420 based on the results of stage 640. These updates are provided to host copresence service 540 at stage 652, and to remote copresence service 570 at stage 654. Stages 650, 652, and 654 can correspond to stages 620, 622, and 624, respectively, described above, and the steps described above can repeat indefinitely as host device 410 hosts application 510, and remote device 420 views and/or interacts with its shared version of the application. In some examples, bandwidth usage of the above process can be controlled by modulating the rate at which updates are provided by the host device. For example, increasing the time that elapses between updates (e.g., between stage 620 and stage 650) can reduce the bandwidth required. Example systems and methods for accommodating changes in data throughput, and for synchronizing devices that may have different rates of data throughput, are described in U.S. patent applications Ser. Nos. 15/940,892 and 16/011,413. In addition, in some examples, the data size of the updates between host application 510 and remote device 420 can be optimized by limiting the content of scenegraphs sent in the updates. For example, as described above, the host application can determine (e.g., at stage 650) elements of a scenegraph that may be invisible at remote device 420 (e.g., because they exist outside a predicted camera view of remote device 420), and cull those elements from the scenegraph before sending the scenegraph to remote device 420.

In some examples, a cloud server, or other suitable storage, can maintain a base scenegraph for shared applications, in order to facilitate new remote devices joining a shared session that is already in progress. For example, with respect to FIG. 4A, a cloud server 450 could maintain scenegraphs corresponding to each of the Chess application, the Calculator application, and the Scrabble application, respectively. In such examples, when the application becomes shared with an additional remote device (e.g., remote device 430), the device can initially be presented with the base scenegraph present on the cloud server— making it possible for the new remote device to join the application in progress, without the overhead of creating a new scenegraph to correspond to the application. In such examples, it may be necessary for host device 410 to present incremental updates (e.g., changes since a previous update) to remote devices; since a base state scenegraph is always available from cloud server 450, a remote device needs only to obtain the base state scenegraph, and the changes since the corresponding base state, in order to reconstruct a scenegraph corresponding to a current state of application 510.

In examples described above, a host device (e.g., device 410) executes an application and shares the application with a remote device (e.g., device 420). The host device generates a scenegraph and sends it to the remote device, from which scenegraph the remote device renders a view for display. In examples described above, the host device also generates a scenegraph for itself (which may or may not be the same scenegraph sent to the remote device), and the host device uses the scenegraph to render a view for display on the host device. This may be desirable in a situation where the host device and the remote device belong to two users who wish to participate in the same shared application—for instance, a user of the host device may wish to play a user of the remote device in a shared Chess application. However, in some examples, the host device may simply send the scenegraph to each remote device, without rendering a view for itself.

Figure 4B:
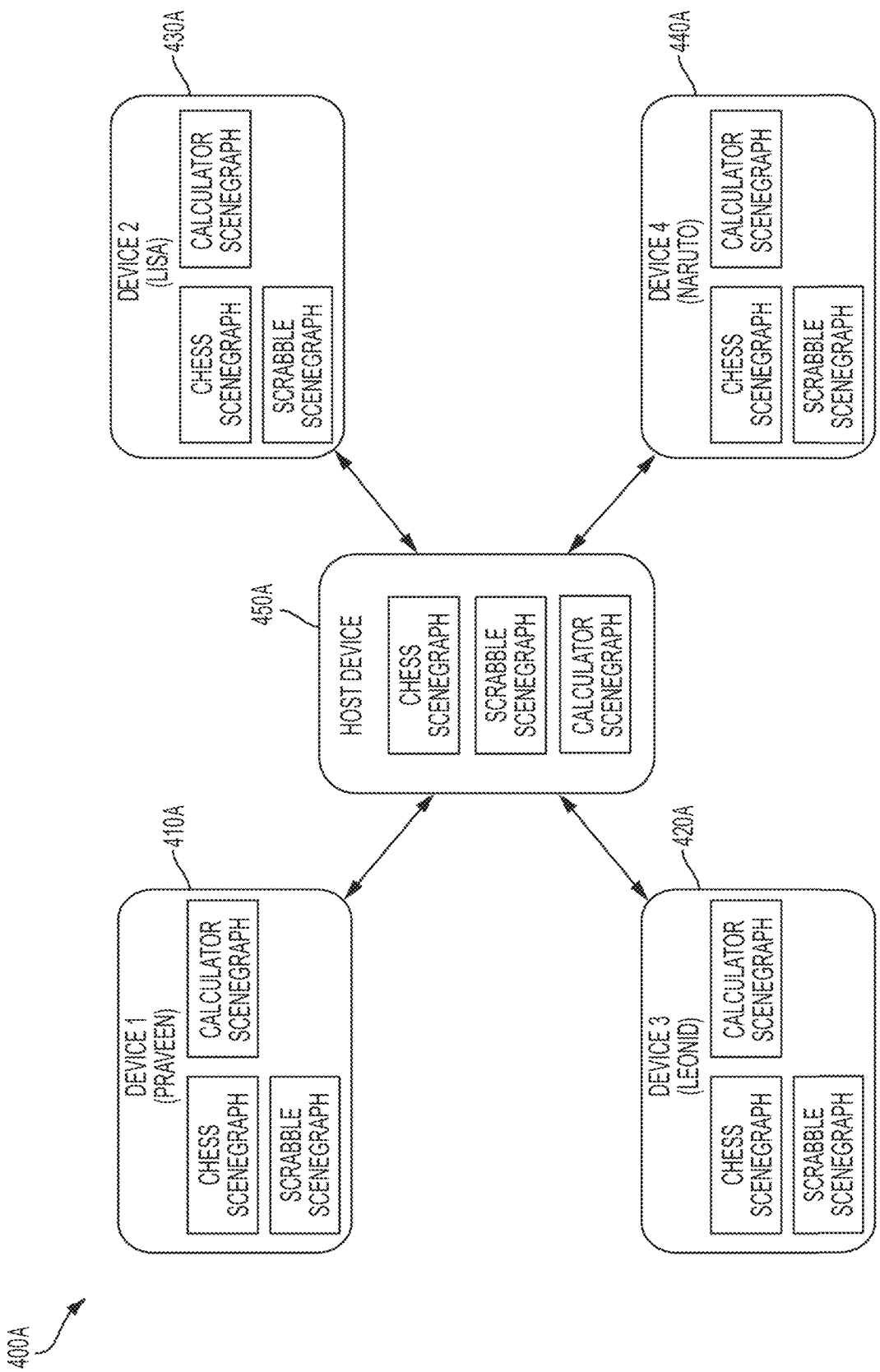

FIG. 4B describes one such "headless" example. In example 400A shown in FIG. 4B, the host device (e.g., 450A in FIG. 4B) may be a dedicated hosting entity, such as a data center, a cloud server, or one or more networked servers, configured for the primary purpose of sharing applications with remote devices (e.g., remote device 410A, 420A, 430A, and 440A) such as described above. This configuration can be advantageous where, for instance, the host device may have access to greater computing resources than the remote devices with which it communicates. In the example shown, host device 450A executes one or more applications (e.g., Chess, Calculator, Scrabble). Host device 450A can generate and maintain scenegraphs for each of those applications, such as shown in FIG. 4B, and sends those scenegraphs to each remote device, such as described above. Each remote device may then determine a local view, and may display that view to its respective user.

Logic executing on the host device can update the state of an application, such as described above, with respect to a remote device. For example, the host device logic can receive an updated location of a remote device, e.g., an update when the user of the device moves from a living room into a kitchen. When the user walks into the kitchen, the new location can be provided from the remote device to the host device; an updated scenegraph and/or associated assets can then be provided from the host device to the remote device, which can then view the new content.

In some examples, the host device may be configured to host a large number of applications, and in some examples, remote devices connecting to the host device never need to download or install an application—instead relying on the host device to provide the remote device with all necessary data for the application when a sharing session is initiated. Applications can run as server-side programs on the host device using any suitable hosting framework. In some cases, a single instance of an application on the host device can be shared with different client participants. Seamless cross-platform application sharing can be made possible in this manner.

In some examples, requests to execute or share an application can be initiated by either a host device (e.g., host device 450A in FIG. 4B), or by a remote device (e.g., remote device 410A, 420A, 430A, or 440A in FIG. 4B), such as described above. Sharing requests can be accepted or rejected by the other party to the request (e.g., the remote device in a request by the host device, or the host device in a request by the remote device).

Any suitable method can be used to initiate executing or sharing an application. In some examples, a user can expressly initiate executing or sharing an application, such as by interacting with a conventional user interface (e.g., a menu listing a selection of applications). In some examples, a user of a computing device (e.g., device 410A with respect to FIG. 4B) can initiate executing or sharing an application by interacting with a trigger, such as by scanning (e.g., via a camera of a head-mounted device) a visual target containing a QR code, a bar code, a URL, or other data that can include addressing information for a host device (e.g., host device 450A with respect to FIG. 4B). In some cases, the trigger may comprise entering or exiting a particular location, such as detected by a GPS unit, and addressing information may be associated (e.g., via a lookup table) with the location. In some examples, a single trigger can be associated with two or more applications.

In response to the interaction, the user's device can use the addressing information to communicate a request to the host device. In response to receiving the request, the host device can initiate sharing an application with the user's device (e.g., as described above with respect to stage 610 of FIG. 6); serve a file to the user's device (e.g., an executable file to be run on the user's device); or take some other action. In examples where the user's device interacts with a virtual environment, such triggers can be placed in the virtual environment (in some cases, by other users of a shared virtual environment, using spatial information such as Persistent Coordinate Frame (PCF) data), and the user's interaction with those triggers in the virtual environment can result in executing or sharing an application as described above. Further, in some cases, triggers can be associated with sensor data, such as images received via a camera of a head-mounted device. For instance, a user may encounter a chess board at a particular location (e.g., a real-world location or a location in a virtual environment). By looking at, approaching, touching, or otherwise interacting with the chess board, the user can initiate a request to execute or share a chess application (e.g., as described above with respect to FIG. 6). In this manner, applications can be executed and/or shared not only at a user's own initiative (e.g., via a conventional user interface); but via organic interactions with objects and locations in real, virtual, or hybrid (e.g., augmented reality) environments.

In some cases, data relating to the user's environment (e.g., sensor data such as GPS data, or camera data of a head-mounted device) can be used, to provide one or more parameters to the application. For example, when requesting that a chess application be shared, the user's current location can be used to identify the current weather and time of day, which can be used to determine visual environmental effects (e.g., time-sensitive lighting) for the chess application. Similarly, in some examples, requests to execute or share an application may be predicated on contextual information; for instance, a user may be able to send sharing requests to other devices in his or her vicinity. In some examples, it may be desirable for a "headless" host device (e.g., 450A) to present remote users (e.g., users of 410A, 420A, 430A, 440A) with application sharing requests based on contextual information; for instance, a host device could be configured to present a user with a request to share a theme park application when a user's location is detected at the theme park. In some embodiments, permission may not be required, and content may be shared automatically with a user. In some embodiments, data may be used to initiate an application, but may not be provided to the application itself. For instance, personal data reflecting a user's current location may be used to trigger an application based on that location, but the application data may be prevented from accessing that personal data, such as to promote the user's privacy and confidentiality. Other ways of initiating application sharing requests will be apparent and are within the scope of this disclosure.

The above example processes of a computer system may be provided by any suitable logic circuitry. Suitable logic circuitry may include one or more computer processors (e.g., CPU, GPU, etc.) that, when executing instructions implemented in a software program, perform the processes. Additionally, such processes can also be provided via corresponding logic design implemented in hardware logic circuitry, such as programmable logic (e.g., PLD, FPGA, etc.) or customized logic (e.g., ASIC, etc.) implementing logic designs that provide the processes. Furthermore, such processes can be provided via an implementation that combines both one or more processors running software and hardware logic circuitry.

Figure 7:
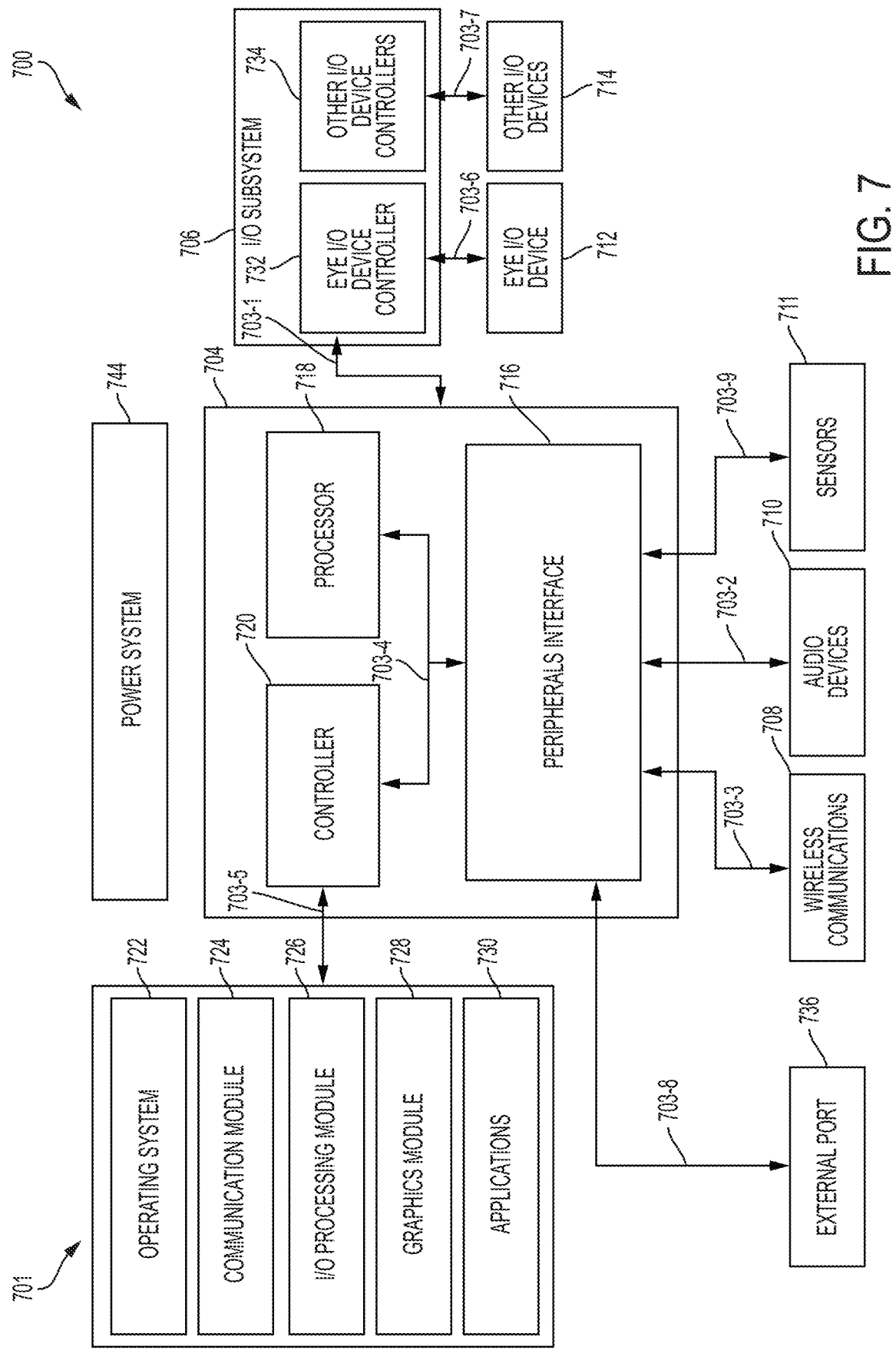
FIG. 7 illustrates an example of a system architecture that may be embodied within a portable or non-portable device according to examples of the disclosure.

FIG. 7 illustrates an example system 700 that may be used to implement any or all of the above examples. The above examples (in whole or in part) may be embodied within any portable device (including wearable device) or non-portable device—for example, a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a head-mounted device (which may include, for example, an integrated display), or any other system or device adaptable to the inclusion of example system architecture 700, including combinations of two or more of these types of devices. The above examples may be embodied in two or more physically separate devices, such as two or more computers communicating via a wireless network. The above examples may be embodied in two or more physically different devices, such as a belt pack that communicates data to and/or from a head-mounted display. FIG. 7 is a block diagram of one example of system 700 that generally includes one or more computer-readable mediums 701, processing system 704, I/O subsystem 706, radio frequency (RF) circuitry 708, audio circuitry 710, and sensors circuitry 711. These components may be coupled by one or more communication buses or signal lines 703.

It should be apparent that the architecture shown in FIG. 7 is only one example architecture of system 700, and that system 700 could have more or fewer components than shown, or a different configuration of components. The various components shown in FIG. 7 can be implemented in hardware, software, firmware or any combination thereof, including one or more signal processing and/or application specific integrated circuits.

Referring to example system architecture 700 in FIG. 7, RF circuitry 708 can be used to send and receive information over a wireless link or network to one or more other devices and includes well-known circuitry for performing this function. RF circuitry 708 and audio circuitry 710 can be coupled to processing system 704 via peripherals interface 716. Interface 716 can include various known components for establishing and maintaining communication between peripherals and processing system 704. Audio circuitry 710 can be coupled to audio speaker 750 and microphone 752 and can include known circuitry for processing voice signals received from interface 716 to enable a user to communicate in real-time with other users. In some examples, audio circuitry 710 can include a headphone jack (not shown).

Sensors circuitry 711 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, an electrooculography (EOG) sensor, and various system sensors which can sense remaining battery life, power consumption, processor speed, CPU load, and the like. In examples such as involving a head-mounted device, one or more sensors may be employed in connection with functionality related to a user's eye, such as tracking a user's eye movement, or identifying a user based on an image of his or her eye.

Peripherals interface 716 can couple input and output peripherals of the system to processor 718 and computer-readable medium 701. One or more processors 718 may communicate with one or more computer-readable mediums 701 via controller 74. Computer-readable medium 701 can be any device or medium (excluding signals) that can store code and/or data for use by one or more processors 718. In some examples, medium 701 can be a non-transitory computer-readable storage medium. Medium 701 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 701 may also include a transmission medium for carrying information-bearing signals indicative of computer instructions or data (but excluding the signals and excluding a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MANs) and the like.

One or more processors 718 can run various software components stored in medium 701 to perform various functions for system 700. In some examples, the software components can include operating system 722, communication module (or set of instructions) 724, I/O processing module (or set of instructions) 726, graphics module (or set of instructions) 728, and one or more applications (or set of instructions) 730. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 701 may store a subset of the modules and data structures identified above. Furthermore, medium 701 may store additional modules and data structures not described above.

Operating system 722 can include various procedures, sets of instructions, software components and/or drivers for controlling and managing general system tasks (e.g., memory management, storage device control, power management, etc.) and facilitates communication between various hardware and software components.

Communication module 724 can facilitate communication with other devices over one or more external ports 736 or via RF circuitry 708 and can include various software components for handling data received from RF circuitry 708 and/or external port 736.

Graphics module 728 can include various known software components for rendering, animating and displaying graphical objects on one or more display surfaces. Display surfaces may include 2D or 3D displays. Display surfaces may be directly or indirectly coupled to one or more components of example system 700. In examples involving a touch sensing display (e.g., touch screen), graphics module 728 can include components for rendering, displaying, and animating objects on the touch sensing display. In some examples, graphics module 728 can include components for rendering to remote displays. In some examples, such as those incorporating a camera, graphics module 728 can include components for creating and/or displaying a image formed by compositing camera data (such as captured from a head-mounted camera) or photographic data (such as satellite-captured imagery) with rendered graphical objects. In some examples, graphics module can include components for rendering an image to a head-mounted display. In some examples, an image may include a view of an element of virtual content (e.g., an object in a three-dimensional virtual environment), and/or a view of the physical world (e.g., camera input indicating the user's physical surroundings). In some examples, a display may present a composite of virtual content and a view of the physical world. In some examples, the view of the physical world may be a rendered image; in some examples, the view of the physical world may be an image from a camera.

One or more applications 730 can include any applications installed on system 700, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

I/O subsystem 706 can be coupled to eye I/O device 712 and one or more other I/O devices 714 for controlling or performing various functions. For example, eye I/O device 712 can communicate with processing system 704 via eye I/O device controller 732, which can include various components for processing eye input (e.g., sensors for eye tracking) or user gesture input (e.g., optical sensors). One or more other input controllers 734 can receive/send electrical signals from/to other I/O devices 714. Other I/O devices 714 may include physical buttons, dials, slider switches, sticks, keyboards, touch pads, additional display screens, or any combination thereof.

I/O processing module 726 can include various software components for performing various tasks associated with eye I/O device 712 and/or other I/O devices 714, including but not limited to receiving and processing input received from eye I/O device 712 via eye I/O device controller 732, or from other I/O devices 714 via I/O controllers 734. In some examples, I/O devices 714 and/or I/O processing module 726 may perform various tasks associated with gesture input, which may be provided by tactile or non-tactile means. In some examples, gesture input may be provided by a camera or another sensor for detecting movements of a user's eyes, arms, hands, and/or fingers, for example. In some examples, I/O devices 714 and/or I/O processing module 726 may be configured to identify objects on a display with which the user wishes to interact—for example, GUI elements at which a user is pointing. In some examples, eye I/O device 712 and/or I/O processing module 726 may be configured (such as with the assistance of optical or EOG sensors) to perform eye tracking tasks, such as identifying an object, or a region on a display, at which the user is looking. In some examples, a device (such as a hardware "beacon") may be worn or held by a user to assist touch I/O device 712 and/or I/O processing module 726 with gesture-related tasks, such as identifying the location of a user's hands relative to a 2D or 3D environment. In some examples, eye I/O device 712 and/or I/O processing module 726 may be configured to identify a user based on sensor input, such as data from a camera sensor, relating to the user's eye.

In some examples, graphics module 728 can display visual output to the user in a GUI. The visual output may include text, graphics, video, and any combination thereof. Some or all of the visual output may correspond to user-interface objects. In some examples, I/O devices 712 and/or 714 and/or controllers 732 and/or 734 (along with any associated modules and/or sets of instructions in medium 701) can detect and track gestures and/or eye movements, and can convert the detected gestures and/or eye movements into interaction with graphical objects, such as one or more user-interface objects. In examples in which eye I/O device 712 and/or eye I/O device controller 732 are configured to track a user's eye movements, the user can directly interact with graphical objects by looking at them.

Feedback may be provided, such as by eye I/O device 712 or another I/O device 714, based a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 700 can also include power system 744 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 716, one or more processors 718, and memory controller 720 may be implemented on a single chip, such as processing system 704. In some other examples, they may be implemented on separate chips.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
at a host device having a first processor, executing a first application via the first processor;
determining a first state of the first application;
generating a first scenegraph corresponding to the first state of the first application;
rendering to a first display a first view corresponding to the first scenegraph; and
presenting, to a first remote device having a second display and a second processor distinct from the first processor, the first scenegraph,
wherein:
the first remote device is configured to, in response to receiving the first scenegraph, render to the second display a second view corresponding to the first scenegraph, and
rendering the second view to the second display does not comprise executing the first application via the second processor.

2. The method of claim 1, further comprising:
at the host device, receiving input from the first remote device;
determining, based on the input, a second state of the first application, the second state different than the first state;
generating a second scenegraph corresponding to the second state, the second scenegraph different than the first scenegraph;
presenting, to the first remote device, the second scenegraph,
wherein:
the first remote device is configured to, in response to receiving the second scenegraph, render to the second display a third view corresponding to the second scenegraph without executing the first application, and
rendering the third view to the second display does not comprise executing the first application via the second processor.

3. The method of claim 1, wherein the first view corresponding to the first scenegraph is different than the second view corresponding to the first scenegraph.

4. The method of claim 1, wherein the first application is installed on the host device and the first application is not installed on the first remote device.

5. The method of claim 1, wherein the first application is installed on the host device and the first application is installed on the first remote device.

6. The method of claim 1, wherein the first remote device is a wearable computing device and the second display is configured to be head-mounted to a user of the first remote device.

7. The method of claim 1, further comprising presenting, to a second remote device having a third display and a third processor, the first scenegraph, wherein:
the second remote device is configured to, in response to receiving the first scenegraph, render to the third display a third view corresponding to the first scenegraph, and
rendering the third view to the third display does not comprise executing the first application via the third processor.

8. The method of claim 1, further comprising determining a first state of a second application, wherein:
the first scenegraph further corresponds to the first state of the second application, and
rendering the second view to the second display does not comprise executing the second application via the second processor.

9. The method of claim 1, further comprising receiving, from the first remote device, a request to present the first scenegraph, wherein:
the request to present the first scenegraph is generated in response to an interaction between the first remote device and a trigger, and
presenting the first scenegraph to the first remote device is performed in response to receiving the request.

10. The method of claim 9, wherein the trigger comprises a QR code.

11. The method of claim 9, wherein the trigger comprises location information.

12. The method of claim 9, wherein the request comprises an identification of the first application.

13. A non-transitory machine readable medium storing instructions, which when executed by a first device having one or more processors including a first processor, cause the first device to perform a method comprising:
executing a first application via the first processor;
determining a first state of the first application;
generating a first scenegraph corresponding to the first state of the first application;
rendering to a first display a first view corresponding to the first scenegraph; and
presenting, to a second device having a second display and a second processor distinct from the first processor, the first scenegraph,
wherein:
the second device is remote to the first device,
the second device is configured to, in response to receiving the first scenegraph, render to the second display a second view corresponding to the first scenegraph, and
rendering the second view to the second display does not comprise executing the first application via the second processor.

14. The non-transitory machine readable medium of claim 13, wherein the method further comprises:
at the first device, receiving input from the second device;
determining, based on the input, a second state of the first application, the second state different than the first state;
generating a second scenegraph corresponding to the second state, the second scenegraph different than the first scenegraph;
presenting, to the second device, the second scenegraph,
wherein:
the second device is configured to, in response to receiving the second scenegraph, render to the second display a third view corresponding to the second scenegraph without executing the first application, and
rendering the third view to the second display does not comprise executing the first application via the second processor.

15. The non-transitory machine readable medium of claim 13, wherein the first view is different than the second view.

16. The non-transitory machine readable medium of claim 13, wherein the first application is installed on the first device and the first application is not installed on the second device.

17. The non-transitory machine readable medium of claim 13, wherein the first application is installed on the first device and the first application is installed on the second device.

18. The non-transitory machine readable medium of claim 13, wherein the second device is a wearable computing device and the second display is configured to be head-mounted to a user of the second device.

19. The non-transitory machine readable medium of claim 13, wherein the method further comprises presenting, to a second remote device having a third display and a third processor, the first scenegraph, and
wherein:
the second remote device is configured to, in response to receiving the first scenegraph, render to the third display a third view corresponding to the first scenegraph, and rendering the third view to the third display does not comprise executing the first application via the third processor.

20. The non-transitory machine readable medium of claim 13, wherein the method further comprises determining a first state of a second application, and wherein:
the first scenegraph further corresponds to the first state of the second application, and
rendering the second view to the second display does not comprise executing the second application via the second processor.

21. The non-transitory machine readable medium of claim 13, wherein the method further comprises receiving, from the first remote device, a request to present the first scenegraph, and wherein:
the request to present the first scenegraph is generated in response to an interaction between the first remote device and a trigger, and
presenting the first scenegraph to the first remote device is performed in response to receiving the request.

22. The non-transitory machine readable medium of claim 21, wherein the trigger comprises a QR code.

23. The non-transitory machine readable medium of claim 21, wherein the trigger comprises location information.

24. The non-transitory machine readable medium of claim 21, wherein the request comprises an identification of the first application.

25. A first device having one or more processors including a first processor, the first device capable of performing a method comprising:
executing a first application via the first processor;
determining a first state of the first application;
generating a first scenegraph corresponding to the first state of the first application;
rendering to a first display a first view corresponding to the first scenegraph; and
presenting, to a second device having a second display and a second processor distinct from the first processor, the first scenegraph,
wherein:
the second device is remote to the first device,
the second device is configured to, in response to receiving the first scenegraph, render to the second display a second view corresponding to the first scenegraph, and
rendering the second view to the second display does not comprise executing the first application via the second processor.

26. The device of claim 25, wherein the method further comprises:
at the first device, receiving input from the second device;
determining, based on the input, a second state of the first application, the second state different than the first state;
generating a second scenegraph corresponding to the second state, the second scenegraph different than the first scenegraph;
presenting, to the second device, the second scenegraph, wherein:
the second device is configured to, in response to receiving the second scenegraph, render to the second display a third view corresponding to the second scenegraph without executing the first application, and
rendering the third view to the second display does not comprise executing the first application via the second processor.

27. The device of claim 25, wherein the first view is different than the second view.

28. The device of claim 25, wherein the first application is installed on the first device and the first application is not installed on the second device.

29. The device of claim 25, wherein the first application is installed on the first device and the first application is installed on the second device.

30. The device of claim 25, wherein the second device is a wearable computing device and the second display is configured to be head-mounted to a user of the second device.

31. The device of claim 25, wherein the method further comprises presenting, to a second remote device having a third display and a third processor, the first scenegraph, and wherein:
the second remote device is configured to, in response to receiving the first scenegraph, render to the third display a third view corresponding to the first scenegraph, and rendering the third view to the third display does not comprise executing the first application via the third processor.

32. The device of claim 25, wherein the method further comprises determining a first state of a second application, and wherein:
the first scenegraph further corresponds to the first state of the second application, and
rendering the second view to the second display does not comprise executing the second application via the second processor.

33. The device of claim 25, wherein the method further comprises receiving, from the first remote device, a request to present the first scenegraph, and wherein:
the request to present the first scenegraph is generated in response to an interaction between the first remote device and a trigger, and
presenting the first scenegraph to the first remote device is performed in response to receiving the request.

34. The device of claim 33, wherein the trigger comprises a QR code.

35. The device of claim 33, wherein the trigger comprises location information.

36. The device of claim 33, wherein the request comprises an identification of the first application.

* * * * *

(12) EX PARTE REEXAMINATION CERTIFICATE (13050th)
United States Patent
J D et al.

(10) Number: US 11,201,953 C1
(45) Certificate Issued: Oct. 10, 2025

(54) APPLICATION SHARING

(71) Applicant: Magic Leap, Inc., Plantation, FL (US)

(72) Inventors: Praveen Babu J D, Plantation, FL (US); Karen Stolzenberg, Fort Lauderdale, FL (US); Jehangir Tajik, Fort Lauderdale, FL (US); Rohit Anil Talwalkar, Weston, FL (US); Colman Thomas Bryant, Fort Lauderdale, FL (US); Leonid Zolotarev, Weston, FL (US)

Reexamination Request:
No. 90/019,624, Aug. 16, 2024

Reexamination Certificate for:
Patent No.: 11,201,953
Issued: Dec. 14, 2021
Appl. No.: 16/518,891
Filed: Jul. 22, 2019

Related U.S. Application Data

(60) Provisional application No. 62/741,761, filed on Oct. 5, 2018, provisional application No. 62/742,259, filed on Oct. 5, 2018, provisional application No. 62/726,863, filed on Sep. 4, 2018, provisional application No. 62/702,844, filed on Jul. 24, 2018.

(51) Int. Cl.
| | |
|---|---|
| *H04L 29/06* | (2006.01) |
| *G02B 27/01* | (2006.01) |
| *G06T 19/00* | (2011.01) |
| *H04L 9/40* | (2022.01) |
| *H04L 29/08* | (2006.01) |
| *H04L 67/131* | (2022.01) |
| *H04L 67/51* | (2022.01) |
| *H04L 67/75* | (2022.01) |
| *H04W 4/021* | (2018.01) |

(52) U.S. Cl.
CPC .......... *H04L 67/131* (2022.05); *G02B 27/017* (2013.01); *G06T 19/006* (2013.01); *H04L 63/10* (2013.01); *H04L 67/51* (2022.05); *H04L 67/75* (2022.05); *H04W 4/021* (2013.01)

(58) Field of Classification Search
None
See application file for complete search history.

(56) References Cited

To view the complete listing of prior art documents cited during the proceeding for Reexamination Control Number 90/019,624, please refer to the USPTO's Patent Electronic System.

*Primary Examiner* — Dennis G Bonshock

(57) ABSTRACT

A host device having a first processor executes an application via the first processor. The host device determines a state of the application. A scenegraph is generated corresponding to the state of the application, and the scenegraph is presented to a remote device having a display and a second processor. The remote device is configured to, in response to receiving the scenegraph, render to the display a view corresponding to the scenegraph, without executing the application via the second processor.

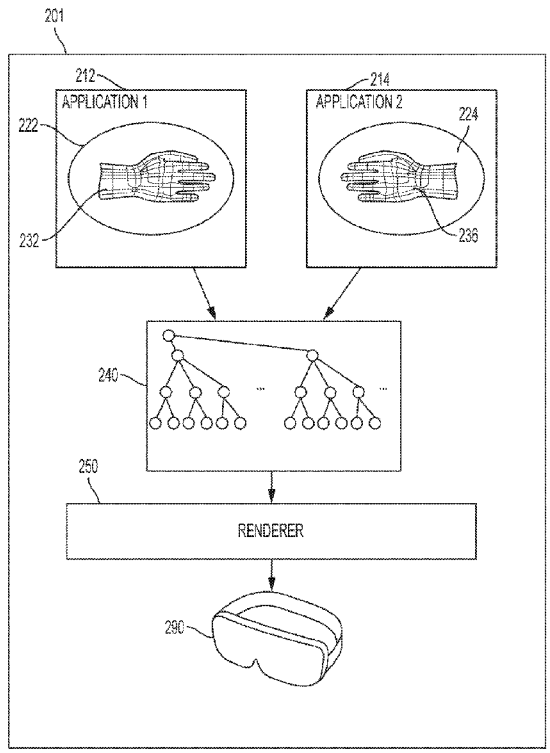

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8, 20 and 32 are cancelled.

Claims 1-2, 7, 13-14, 19, 25-26 and 31 are determined to be patentable as amended.

Claims 3-6, 9-12, 15-18, 21-24, 27-30 and 33-36, dependent on an amended claim, are determined to be patentable.

New claims 37-51 are added and determined to be patentable.

1. A method comprising:
   at a host device having a first processor, executing a first application via the first processor;
   determining a first state of the first application;
   *determining a first state of a second application executing on the first processor;*
   *at the host device,* generating a first scenegraph corresponding to the first state of the first application, *wherein the first scenegraph represents a hierarchical relationship among a plurality of objects, and wherein the first scenegraph comprises a first plurality of nodes, each node of the first plurality of nodes associated with an object of the plurality of objects*;
   rendering to a first display a first view corresponding to the first scenegraph, *said rendering comprising traversing the first scenegraph*; and
   presenting, to a first remote device having a second display and a second processor distinct from the first processor, the first scenegraph,
   wherein:
   the first remote device is configured to, in response to receiving the first scenegraph, render to the second display a second view corresponding to the first scenegraph, *said rendering comprising traversing the first scenegraph,*
   *the first scenegraph further corresponds to the first state of the second application,*
   *rendering the second view to the second display does not comprise executing the second application via the second processor,* and
   rendering the second view to the second display does not comprise executing the first application via the second processor.

2. The method of claim 1, further comprising:
   at the host device, receiving input from the first remote device;
   determining, based on the input, a second state of the first application, the second state different than the first state;
   generating a second scenegraph corresponding to the second state, the second scenegraph different than the first scenegraph, *wherein the second scenegraph comprises a second plurality of nodes, each node of the second plurality of nodes associated with an object of the plurality of objects*;
   presenting, to the first remote device, the second scenegraph, wherein:
   the first remote device is configured to, in response to receiving the second scenegraph, render to the second display a third view corresponding to the second scenegraph without executing the first application, *said rendering comprising traversing the second scenegraph,* and
   rendering the third view to the second display does not comprise executing the first application via the second processor.

7. The method of claim 1, further comprising presenting, to a second remote device having a third display and a third processor, the first scenegraph,
   wherein:
   the second remote device is configured to, in response to receiving the first scenegraph, render to the third display a third view corresponding to the first scenegraph, *said rendering comprising traversing the first scenegraph,* and
   rendering the third view to the third display does not comprise executing the first application via the third processor.

13. A non-transitory machine readable medium storing instructions, which when executed by a first device having one or more processors including a first processor, cause the first device to perform a method comprising:
    executing a first application via the first processor;
    determining a first state of the first application;
    *determining a first state of a second application executing on the first processor;*
    generating, *at the first device,* a first scenegraph corresponding to the first state of the first application, *wherein the first scenegraph represents a hierarchical relationship among a plurality of objects, and wherein the first scenegraph comprises a first plurality of nodes, each node of the first plurality of nodes associated with an object of the plurality of objects*;
    rendering to a first display a first view corresponding to the first scenegraph, *said rendering comprising traversing the first scenegraph*; and
    presenting, to a second device having a second display and a second processor distinct from the first processor, the first scenegraph,
    wherein:
    the second device is remote to the first device,
    *the first scenegraph further corresponds to the first state of the second application,* the second device is configured to, in response to receiving the first scenegraph, render to the second display a second view corresponding to the first scenegraph, *said rendering comprising traversing the first scenegraph,*
    *rendering the second view to the second display does not comprise executing the second application via the second processor,* and
    rendering the second view to the second display does not comprise executing the first application via the second processor.

14. The non-transitory machine readable medium of claim 13, wherein the method further comprises:
    at the first device, receiving input from the second device;
    determining, based on the input, a second state of the first application, the second state different than the first state;

generating a second scenegraph corresponding to the second state, the second scenegraph different than the first scenegraph, *wherein the second scenegraph comprises a second plurality of nodes, each node of the second plurality of nodes associated with an object of the plurality of objects*;

presenting, to the second device, the second scenegraph, wherein:

the second device is configured to, in response to receiving the second scenegraph, render to the second display a third view corresponding to the second scenegraph without executing the first application, *said rendering comprising traversing the second scenegraph*, and rendering the third view to the second display does not comprise executing the first application via the second processor.

19. The non-transitory machine readable medium of claim 13, wherein the method further comprises presenting, to a second remote device having a third display and a third processor, the first scenegraph, and wherein:

the second remote device is configured to, in response to receiving the first scenegraph, render to the third display a third view corresponding to the first scenegraph, *said rendering comprising traversing the first scenegraph*, and rendering the third view to the third display does not comprise executing the first application via the third processor.

25. A first device having one or more processors including a first processor, the first device capable of performing a method comprising:

executing a first application via the first processor;
determining a first state of the first application;
*determining a first state of a second application executing on the first processor;*
generating, *at the first device*, a first scenegraph corresponding to the first state of the first application, wherein the first scenegraph represents a hierarchical relationship among a plurality of objects, and wherein the first scenegraph comprises a first plurality of nodes, each node of the first plurality of nodes associated with an object of the first plurality of objects;
rendering to a first display a first view corresponding to the first scenegraph, *said rendering comprising traversing the first scenegraph*; and
presenting, to a second device having a second display and a second processor distinct from the first processor, the first scenegraph, wherein:

the second device is remote to the first device,
*the first scenegraph further corresponds to the first state of the second application,*
the second device is configured to, in response to receiving the first scenegraph, render to the second display a second view corresponding to the first scenegraph, *said rendering comprising traversing the first scenegraph, rendering the second view to the second display does not comprise executing the second application via the second processor,* and
rendering the second view to the second display does not comprise executing the first application via the second processor.

26. The device of claim 25, wherein the method further comprises:

at the first device, receiving input from the second device;
determining, based on the input, a second state of the first application, the second state different than the first state;

generating a second scenegraph corresponding to the second state, the second scenegraph different than the first scenegraph, *wherein the second scenegraph comprises a second plurality of nodes, each node of the second plurality of nodes associated with an object of the plurality of objects*;

presenting, to the second device, the second scenegraph, wherein:

the second device is configured to, in response to receiving the second scenegraph, render to the second display a third view corresponding to the second scenegraph without executing the first application, *said rendering comprising traversing the second scenegraph*, and rendering the third view to the second display does not comprise executing the first application via the second processor.

31. The device of claim 25, wherein the method further comprises presenting, to a second remote device having a third display and a third processor, the first scenegraph, and wherein:

the second remote device is configured to, in response to receiving the first scenegraph, render to the third display a third view corresponding to the first scenegraph, *said rendering comprising traversing the first scenegraph*, and rendering the third view to the third display does not comprise executing the first application via the third processor.

*37. The method of claim 1, wherein the first plurality of nodes represents a logical relationship among the plurality of objects.*

*38. The method of claim 1, wherein the first plurality of nodes represents a spatial relationship among the plurality of objects.*

*39. The method of claim 1, wherein the plurality of objects comprises a plurality of 2D or 3D geometric primitives.*

*40. The method of claim 39, further comprising:*
*identifying one or more orphaned nodes in the first scenegraph; and*
*deleting the one or more orphaned nodes in the first scenegraph.*

*41. The method of claim 40, further comprising unloading object assets corresponding to the one or more orphaned nodes.*

*42. The non-transitory machine readable medium of claim 13, wherein the first plurality of nodes represents a logical relationship among the plurality of objects.*

*43. The non-transitory machine readable medium of claim 13, wherein the first plurality of nodes represents a spatial relationship among the plurality of objects.*

*44. The non-transitory machine readable medium of claim 13, wherein the plurality of objects comprises a plurality of 2D or 3D geometric primitives.*

*45. The non-transitory machine readable medium of claim 44, wherein the method further comprises:*
*identifying one or more orphaned nodes in the first scenegraph; and*
*deleting the one or more orphaned nodes in the first scenegraph.*

*46. The non-transitory machine readable medium of claim 45, wherein the method further comprises unloading object assets corresponding to the one or more orphaned nodes.*

47. The device of claim 25, wherein the first plurality of nodes represents a logical relationship among the plurality of objects.

48. The device of claim 25, wherein the first plurality of nodes represents a spatial relationship among the plurality of objects.

49. The device of claim 25, wherein the plurality of objects comprises a plurality of 2D or 3D geometric primitives.

50. The device of claim 49, wherein the method further comprises:
   identifying one or more orphaned nodes in the first scenegraph; and
   deleting the one or more orphaned nodes in the first scenegraph.

51. The device of claim 50, wherein the method further comprises unloading object assets corresponding to the one or more orphaned nodes.

* * * * *